(12) United States Patent
Said

(10) Patent No.: US 9,983,289 B2
(45) Date of Patent: *May 29, 2018

(54) AUDIO NAVIGATION SYSTEM FOR THE VISUALLY IMPAIRED

(71) Applicant: Sensible Innovations, LLC, Springfield, IL (US)

(72) Inventor: Rasha Said, Springfield, IL (US)

(73) Assignee: Sensible Innovations, LLC, Springfield, IL (US)

( * ) Notice: Subject to any disclaimer, the term of this patent is extended or adjusted under 35 U.S.C. 154(b) by 0 days. days.

This patent is subject to a terminal disclaimer.

(21) Appl. No.: 15/638,614

(22) Filed: Jun. 30, 2017

(65) Prior Publication Data
US 2017/0307719 A1   Oct. 26, 2017

Related U.S. Application Data

(63) Continuation of application No. 15/062,942, filed on Mar. 7, 2016, now Pat. No. 9,726,746.
(Continued)

(51) Int. Cl.
*H04W 4/00* (2018.01)
*G01C 21/20* (2006.01)
(Continued)

(52) U.S. Cl.
CPC ............... *G01S 1/08* (2013.01); *G01C 21/20* (2013.01); *G01S 5/0027* (2013.01); *G01S 5/02* (2013.01);
(Continued)

(58) Field of Classification Search
CPC ....... G01C 21/20; G01C 21/206; G01S 19/42; G01S 1/08; G01S 5/0027; G01S 5/02;
(Continued)

(56) References Cited

U.S. PATENT DOCUMENTS 5,806,017 A * 9/1998 Hancock ................... G01S 1/70
701/428
9,204,251 B1 * 12/2015 Mendelson .............. G08G 1/14
(Continued)

*Primary Examiner* — Nathan Taylor
(74) *Attorney, Agent, or Firm* — Richards Patent Law PC.

(57) ABSTRACT

A navigation system featuring audio prompts including: a database including a plurality of beacon identifiers corresponding to physical beacons that are members of quadrants including one or more beacons, the database including navigation instructions between beacons in a quadrant and between beacons and adjacent quadrants; a controller adapted to: provide a first beacon and a destination beacon, determine a route from the first beacon to the destination beacon in a destination quadrant, announce, via the speaker, navigation instructions from the first beacon to a first quadrant of the route, for each quadrant along the route: receive, a newly encountered beacon identifier; and announce navigation instructions for the user to navigate from the newly encountered beacon to the next quadrant in the ordered list, and upon receiving a beacon identifier of a detected beacon in the destination quadrant, announce navigation instructions to navigate from the detected beacon to the destination beacon.

12 Claims, 17 Drawing Sheets

Related U.S. Application Data

(60) Provisional application No. 62/129,232, filed on Mar. 6, 2015.

(51) Int. Cl.
  *G01S 1/08* (2006.01)
  *H04W 4/04* (2009.01)
  *H04W 4/02* (2018.01)
  *G06F 3/16* (2006.01)
  *G01S 19/42* (2010.01)
  *G01S 5/00* (2006.01)
  *G01S 5/02* (2010.01)
  *G01S 5/12* (2006.01)

(52) U.S. Cl.
  CPC .............. *G01S 5/12* (2013.01); *G01S 19/42* (2013.01); *G06F 3/167* (2013.01); *H04W 4/008* (2013.01); *H04W 4/023* (2013.01); *H04W 4/043* (2013.01); *G01C 21/206* (2013.01)

(58) Field of Classification Search
  CPC .......... G01S 5/12; G06F 3/167; H04W 4/008; H04W 4/023; H04W 4/043
  USPC ........... 455/456.1–456.3; 701/206, 411, 428, 701/533, 537
  See application file for complete search history.

(56) References Cited

U.S. PATENT DOCUMENTS

| | | | |
|---|---|---|---|
| 9,380,417 B1* | 6/2016 | Boyle | H04W 4/023 |
| 2005/0099291 A1* | 5/2005 | Landau | A61H 3/061 |
| | | | 340/539.13 |
| 2006/0247849 A1* | 11/2006 | Mohsini | G01C 21/20 |
| | | | 701/434 |
| 2007/0001904 A1* | 1/2007 | Mendelson | G01C 21/206 |
| | | | 342/450 |
| 2010/0121567 A1* | 5/2010 | Mendelson | G01C 21/206 |
| | | | 701/467 |
| 2011/0144902 A1* | 6/2011 | Forte | G01C 21/20 |
| | | | 701/533 |
| 2011/0276266 A1* | 11/2011 | Ballew | G01C 21/206 |
| | | | 701/533 |
| 2015/0079942 A1* | 3/2015 | Kostka | G06Q 30/0633 |
| | | | 455/411 |
| 2015/0330787 A1* | 11/2015 | Cioffi | G06Q 30/0261 |
| | | | 701/537 |
| 2015/0382144 A1* | 12/2015 | Lopez | H04W 4/023 |
| | | | 455/456.2 |
| 2016/0011733 A1* | 1/2016 | Mann | G06F 3/0484 |
| | | | 715/709 |
| 2016/0217496 A1* | 7/2016 | Tuchman | G06Q 30/0269 |
| 2016/0345176 A1* | 11/2016 | DeWitt | G06Q 30/0261 |
| 2017/0010099 A1* | 1/2017 | Simcik | G01S 1/68 |

* cited by examiner

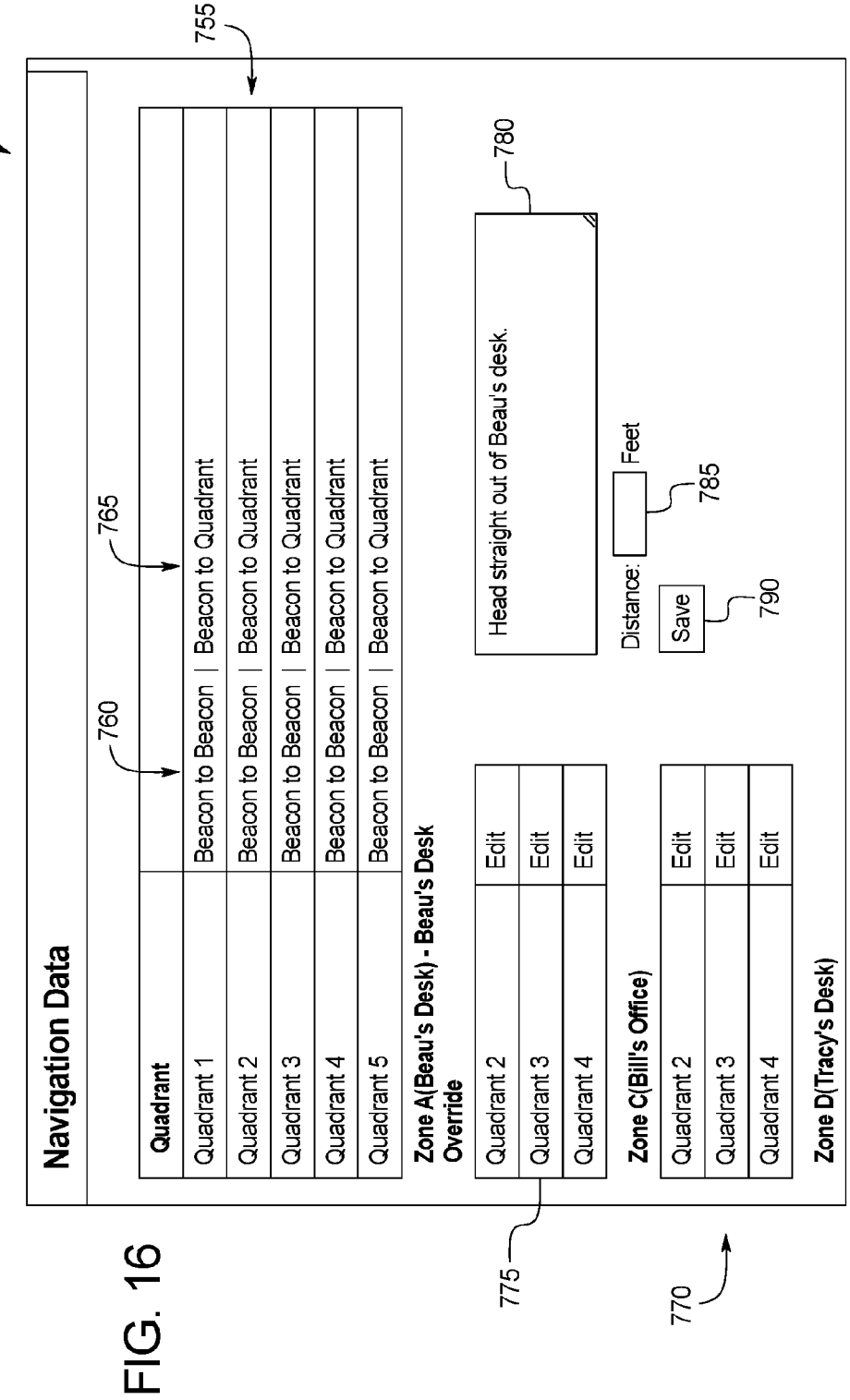

Beacon Configuration Data

805 — UUID: f7826da6-4fa2-4e98-8024-bc5b71e0893e
810 — Major Number: 1000
815 — Minor Number: 1000

Beacon Settings

820 — Venue [Demo ⌄]
825 — ☑ Navigation Beacon
830 — Quadrant [Quadrant 1 ⌄]
835 — Zone [Zone A (Beau's Desk) ⌄]
840 — Range Setting [Close ⌄]
845 — Tell Me More [This is where Beau Ford works This is where Beau Ford works This is where Beau Ford works This is where Beau Ford works This is where Beau Ford works This is where Beau Ford works This is where Beau Ford works This is where Beau Ford works This is where Beau Ford works This is where Beau Ford works This is where Beau Ford works This is where Beau Ford works]

850 — Override Location Name [Beau's Desk Override]
855 — Notes [Beau's Desk]

860 — [Save] [Cancel] [Add New]

FIG. 17

AUDIO NAVIGATION SYSTEM FOR THE VISUALLY IMPAIRED

CROSS-REFERENCE TO RELATED APPLICATIONS

This application incorporates by reference and claims the benefit of priority to U.S. Provisional Patent Application No. 62/129,232 filed Mar. 6, 2015. This application is a continuation application of and claims the benefit of priority to U.S. patent application Ser. No. 15/062,942 filed Mar. 7, 2016, which is hereby incorporated by reference.

BACKGROUND OF THE INVENTION

The present subject matter relates generally to an audio navigation system for the visually impaired. More specifically, the present invention relates to systems and methods for providing visually impaired users with the ability to navigate using an audio navigation system that locates itself using beacons.

According to the World Health Organization (as of 2012), 285 million people are visually impaired worldwide: 39 million are blind and 246 million have low vision. In the United States, 2.2% of the population, i.e. 6.7 million people are visually impaired.

Visual impairment occurs at all ages, even though the elderly tend to have a greater degree of impairment. Among persons of age 65 and older, 21% report some form of visual impairment. Among children 18 years or younger, 0.6% are visually impaired. 82% of people living with blindness are age 50 or older, according to WHO.

The visually impaired have depended on walking sticks, audible traffic signals, and Braille signs to navigate. Without Orientation and Mobility training, blind people cannot navigate new places on their own. They are confined to routes and places they are familiar with and they must be constantly alert to sense cues and counting steps to recall routes memorized through training and practice.

One previous attempt to address this problem used RFID technology. In this approach, frequency sensors were buried in pavement, and visually impaired users operate an electronic walking cane that detects the RFID sensors. The electronic cane provides audio signals to the user, based on where the RFID sensors are buried. This solution required a lot of tags and a complicated algorithm to implement. Thus, there is a need for low-cost, simple approaches to audio navigation.

Another previous attempt is Click-and-Go wayfinding. This approach uses a verbal or text based description coupled with physical trailing (i.e. using a cane or a finger to get some tactile feedback regarding one's surroundings.) Such services have been launched on several School and University campuses, such as the University of Colorado—Boulder, and Baruch College, New York. The San Francisco Lighthouse for the Blind and Visually Impaired is implementing another example of this approach, using specially printed maps and a LiveScribe Smartpen. Unfortunately, the tactile maps of this approach are cumbersome, expensive and are not practical.

An additional previous approach is infrared audible signs. This approach requires hand held devices that have to be pointed to the right direction to hear the sign. Additionally, infrared audible signs are expensive and have high installation cost. Further, because a blind person already has one hand occupied with a cane or guide dogs, a blind person may have difficulty managing further devices.

Accordingly, there is a need for audio navigation system for the visually impaired, as described herein.

BRIEF SUMMARY OF THE INVENTION

To meet the needs described above and others, the present disclosure provides an audio navigation system for the visually impaired that utilizes beacons for navigation. The audio navigation system may be embodied as a mobile application that may be run on a mobile device, such as a smartphone. The audio navigation system may include a remote database that may be accessed over the Internet to permit the mobile device to lookup the identity of an encountered beacon. The blind or visually impaired may use the system to learn and practice routes at a location at their convenience and time and their own pace.

By using beacons to locate itself in space, the system may leverage low-cost technologies. Beacons may be provided in the form of a Bluetooth low energy proximity device that may be detected by a mobile device. For example, the beacons may be commercially available units, such as those that use iBeacon technology. Each beacon may include a unique identifier that the system may receive upon detecting the beacon. The system may then use the unique identifier to look up the beacon's physical location from the database and trigger appropriate functionality for that location. The database may store the latest updated routes and information. With beacons as land mark triggers, an orientation and mobility specialist can create and save routes for the visually impaired by placing beacons on landmarks and storing their location in the database The system may use location functionality of the mobile device to determine its location and bearing. For example, in addition to the beacons, the system may use the mobile devices' GPS unit to determine it's current location. Additionally, the system may use its internal compass to determine the orientations of the user and his or her current angle relative to a landmark. Further, the system may use an accelerometer to determine changes in direction of the system. The GPS unit, compass, and accelerometer unit readings may be combined with beacon information to increase the accuracy of the system's estimation of it's current location, orientation, heading, and other navigation information. Additionally, aspects of the signal may be used to determine relative positioning to the beacon. For example, the Bluetooth signal strength and direction of the beacon signal may be used by the mobile device radio to determine distance to the beacon and the relative orientation of the user to the beacon.

In use, a user may navigate through a space normally. When the user comes within the range of a beacon, the audio navigation system may announce the user's location. The user may be informed of their current location, their relative location to the beacon, their current direction of travel, upcoming landmarks, etc. Audio may be generated by a text-to-speech component that converts text generated by the system into audio announcements that are played back to the user.

To receive directions, the user may access navigation functionality of the device to receive real time direction information using the beacons. The navigation may work in a manner similar to GPS navigation devices. When in a navigation mode, the system may give turn-by-turn directions while continuously updating the user on her present location and recalculating the route in the case the user deviates from the calculated route.

The system may include screens that are adapted to be used by users with visual impairment. For example, the screens may use large, easily readable text. Additionally, the colors of particular screens may convey the currently active functionality to permit an understanding of the applications current operation even if the user cannot fully read the displayed text. Further, the screen may use high contrast icons and colors to convey choices regarding the functionality. Even further, in some embodiments, a Braille display may be connected to the mobile device to provide to provide increased accessibility.

In some embodiments, the top section of the screen is the current location as determined by the reference to the nearest beacon. As a user moves, when the closest beacon to the system changes, the system may announce the new nearest beacon. The announcement may be automatic and triggered by the change, thus, the user does not need to press a button to learn if the closest beacon has changed. The bottom section of the screen may include icons that permit the user to access functionality such as: Go Back, Mute/Un-mute, Repeat, and Speak. The "Go Back" button takes the user back to the most previously accessed menu item. The "Mute/Un-mute" button may be toggled to mute or un-mute the audio announcements, such as the announcements of the nearest beacons. The "Repeat" button triggers the system to repeat the most recent audio announcement. The "Speak" button permits the user to speak an audio command, such as, "Take me to Bergner's."

The top section and bottom section of the screen may be kept constant while the middle portion of the screen may change in response to user actions. The middle of the screen may change to dynamically reflect the current selected functionality. In order to permit easy identification, each screen may match the color of the icon in the menu to permit the visually impaired user to determine the current selected functionality from the color alone.

Additionally, the top of the screen may include an "information" icon that when pressed, permits the user to access the more info section to learn more information about her current location. The user may click on it, or, in some embodiments, the user may push on the speak button on the bottom right icon and speak a command such as "tell me more" or "more info". In some embodiments, an audible cue may be played to indicate that there is an announcement or a promotion at the location. This will permit venues to set announcement or advertisement and define when and where to play it by setting a time frame to play it and associating it with a certain beacon location. The information about the area may display on the screen in addition to being announced as an audio message.

The more info section may play an audio tour including a description of the layout and function of the current location. For example, when a student is passing a main office at the school, it will announce "main office." If the user then says "more information" or clicks on more info to trigger, the system may play the following message to "Push the door to enter to the main office. There, you will find a front desk in front of you in the middle of the office. On the left is a small desk and on the right you will find a rectangular table with chairs for students. The main office includes the Principle's office and the nurse. Here you can ask for information about the school."

At any time, the user may select a "take me to" button to activate the navigation functionality. In some embodiments, upon selecting the "take me to" button, the user may first be prompted to select the venue in which they are currently located. In other embodiments, the system may automatically discover the user's venue via the mobile device's GPS unit or the encountered beacon.

When prompted to choose a destination, a list of venue specific locations may be displayed and the user may have the option to list them name alphabetically, by distance or by category. The user may switch between the lists. When sorting by distance, the nearest exit may always be shown first to permit a quick exit.

The user may speak the destination to the system, or select the destination from a list. The list may be displayed in the middle section of the screen. The application may read off the locations in the list to permit the user to choose a destination even if the list cannot be read. The user may select or speak a selection of the destination. The application may announce the directions to the destination in segments in order to direct the user by way of nearby waypoints as determined by beacons.

In addition to announcing the arrival, the application may update the screen to show the current location, as shown below. The font may be large to permit it to be read by users with sufficient visual ability to read large fonts. Additionally, the screen may be colored to represent that the user has arrived at the destination.

Preprogrammed scripts may control the particular announcements made by the system. The scripts may be flexible and permit the use of information available to the system at any given time. For example, if GPS information is available, particular data about distances may be incorporated into the script as calculated using GPS location. Additionally, the distance between beacons may be available in the database and may be pulled and added to the directions if preferred, depending on the purpose. Further, it is contemplated that if beacons are not currently available, the user may manually update the current location as the user is guided through a space.

When routing the user, the system may use predefined routes that may be set up by O&M specialists using the system, or the system may generate routes dynamically. The system may provide tools, such as an admin portal, to permit O&M specialist to place the beacons and define quadrants in the database associated with the beacon's identification, the beacon location, and the name description of the quadrant. The O&M specialist may further define quadrants that are "adjacent" such that a user may walk directly from one beacon to the other. The O&M specialist may further define particular routes that are particular effective and the system may use the predefined routes when routing users. In this way, the O&M specialist may define specific routes and specific custom route segment descriptions that suit their trainee style.

By having a list of defined adjacent quadrants, the system may also use a path-finding algorithm to determine a short path from the user's current location to a desired destination. For example, when routing to a destination, a routing algorithm creates a routing table with all possible routes, and counts the number of quadrants passing by for each route. The shortest number of quadrants passed becomes the route chosen. After the user begins to travel along the route, they system detects the closest beacon and a first direction segment from current beacon to the next adjacent quadrant in the shortest route is pulled from the database and played. Then, upon encountering the next beacon in the next quadrant, the next segment of the quadrant is played to the user, and so on until the user arrives at his destination. Although the system may generate routes, the system is not meant to replace O&M training, but rather is a complementary aid that will allow the trainer to set up the site so less training trips are needed to the site and more freedom for the trainee to train at his pace and time he chooses.

As noted, the beacons may be looked up using a remote database of the system to determine information about the user's location. The database may be accessible over the Internet and each venue may have its own login ID to login and manage their own information. O&M specialists may access the database through a web portal or administration functionality of the system. Additionally, the system may interface with other databases, for example, via an API, to permit the use of additional navigation information. For example, the system may interoperate with databases for grocery coupons, airport gate information, etc.

Additionally, it is contemplated that the mobile device may occasionally lose its connection with the remote database. Accordingly, in an embodiment, the mobile device will automatically download the beacon database information for a venue (using its geo-location) upon arrival. In this way, navigation may still be accomplished even if a connection with the remote database is lost. This feature is good for underground and museums or malls where signals are sometimes weak.

Further, it is contemplated that beacons may be attached to points of interest that are not fixed. For example, a beacon may be attached to a school bus to alert a child when the bus has arrived.

In an embodiment, a navigation system featuring audio prompts includes: a database including a plurality of beacon identifiers, wherein each beacon identifier corresponds to a physical beacon, wherein each beacon identifier is associated with a location, wherein each beacon is a member of a quadrant, wherein the database defines adjacent quadrants for every quadrant, wherein each quadrant includes one or more beacons, wherein the database includes navigation instructions from each beacon in a quadrant to every other beacon in that quadrant, wherein the database includes navigation instructions from each beacon in a quadrant to every adjacent quadrant; a user interface; a speaker; a controller in communication with the user interface and, the speaker; a memory in communication with the controller, the memory including instructions that, when executed by the controller, cause the controller to: provide a first beacon and a destination beacon, determine a route from the first beacon to the destination beacon in a destination quadrant, wherein the route is determined by finding a path from the first beacon to the destination beacon, wherein the route is an ordered list of navigation points to be encountered as the user moves from the first beacon to the destination beacon, wherein navigation points include beacons and quadrants, announce, via the speaker, navigation instructions for the user to navigate from the first beacon to a first quadrant of the route, for each quadrant along the route: in response to user movement along the route, receive a newly encountered beacon identifier; and announce, via the speaker, navigation instructions for the user to navigate from the newly encountered beacon to the next quadrant in the ordered list, and upon receiving a beacon identifier of a detected beacon in the destination quadrant, announce, via the speaker, navigation instructions for the user to navigate from the detected beacon to the destination beacon.

In an embodiment, the step to provide the first beacon and the destination beacon is accomplished by sub-steps to: receive a first beacon identifier to determine the first beacon, lookup, in the database, a current venue associated with the first beacon identifier, lookup, in the database, a list of locations, display the list of locations as a selectable list on the user interface, and receive a selection of one of the displayed locations from a user through the user interface, the beacon corresponding to the selected location being the destination beacon.

In an embodiment, the list of locations includes an exit in the first position in the list, and a restroom in the second position in the list. In an embodiment, when the newly encountered beacon identifier matches a beacon identifier of the quadrant, announce, via the speaker, arrival at the newly encountered beacon.

In an embodiment, a navigation system featuring audio prompts includes: a database including a plurality of beacon identifiers, wherein each beacon identifier corresponds to a physical beacon, wherein each beacon identifier is associated with a location wherein the database links a pair of beacon identifiers when a person is able to walk between the locations of the corresponding pair of beacons without passing the location of any other beacon; a user interface; a speaker; a Bluetooth communications module that detects and communicates with nearby beacons; a controller in communication with the user interface and the speaker; a memory in communication with the controller, the memory including instructions that, when executed by the controller, cause the controller to: receive a first beacon identifier from a first beacon, lookup, in the database, a current venue associated with the first beacon identifier, lookup, in the database, a list of locations selectable list on the user interface, receive a selection of one of the displayed locations from a user through the user interface, the beacon corresponding to the selected location being a destination beacon, determine a route from the first beacon to the destination beacon, wherein the route is determined by finding a path from the first beacon to the destination beacon, wherein the route is an ordered list of beacons to be encountered as the user moves from the first beacon to the destination beacon, for each beacon along the route: announce, via the speaker, navigation instructions for the user to navigate to a next beacon in the ordered list; in response to user movement along the route, receive a newly encountered beacon identifier; when the newly encountered beacon identifier matches a beacon identifier of the next beacon in the ordered list, announce, via the speaker, arrival at the next beacon; and update the next beacon to the following beacon in the ordered list, and upon receiving a beacon identifier of the selected location, announce, via the speaker, arrival at the selected location.

An object of the invention is to provide a solution to the shortage of O&M specialists by providing a mobile device-driven mobility product.

Another object of the invention is to provide a national database of audible maps for navigation of pedestrian areas.

An advantage of the invention is that it provides a system that permits the visually impaired to walk into any public place and hear the name of points of interest they pass by in real time, providing far greater independence and self-confidence.

Another advantage of the invention is that it provides a navigation system that utilizes graphics that maximize the ability of users with poor vision to understand the information being conveyed.

Yet another advantage of the invention is that it provides a navigation system that permits users with limited vision to be aware of what's around them at that moment to drive curiosity and permit the user to be more active and involved.

Additional examples of an embodiment are attached as an Appendix. It should be noted that various changes and modifications to the presently preferred embodiments described herein will be apparent to those skilled in the art.

Such changes and modifications may be made without departing from the spirit and scope of the present invention and without diminishing its attendant advantages.

BRIEF DESCRIPTION OF THE DRAWINGS

The drawing figures depict one or more implementations in accord with the present concepts, by way of example only, not by way of limitations. In the figures, like reference numerals refer to the same or similar elements.

FIG. 16 illustrates a navigation data input screen to permit an administrator to input navigation instructions between beacons and between beacons and quadrants.

FIG. 17 illustrates an add beacon screen for adding a beacon to the database.

DETAILED DESCRIPTION OF THE INVENTION

Figure 1:
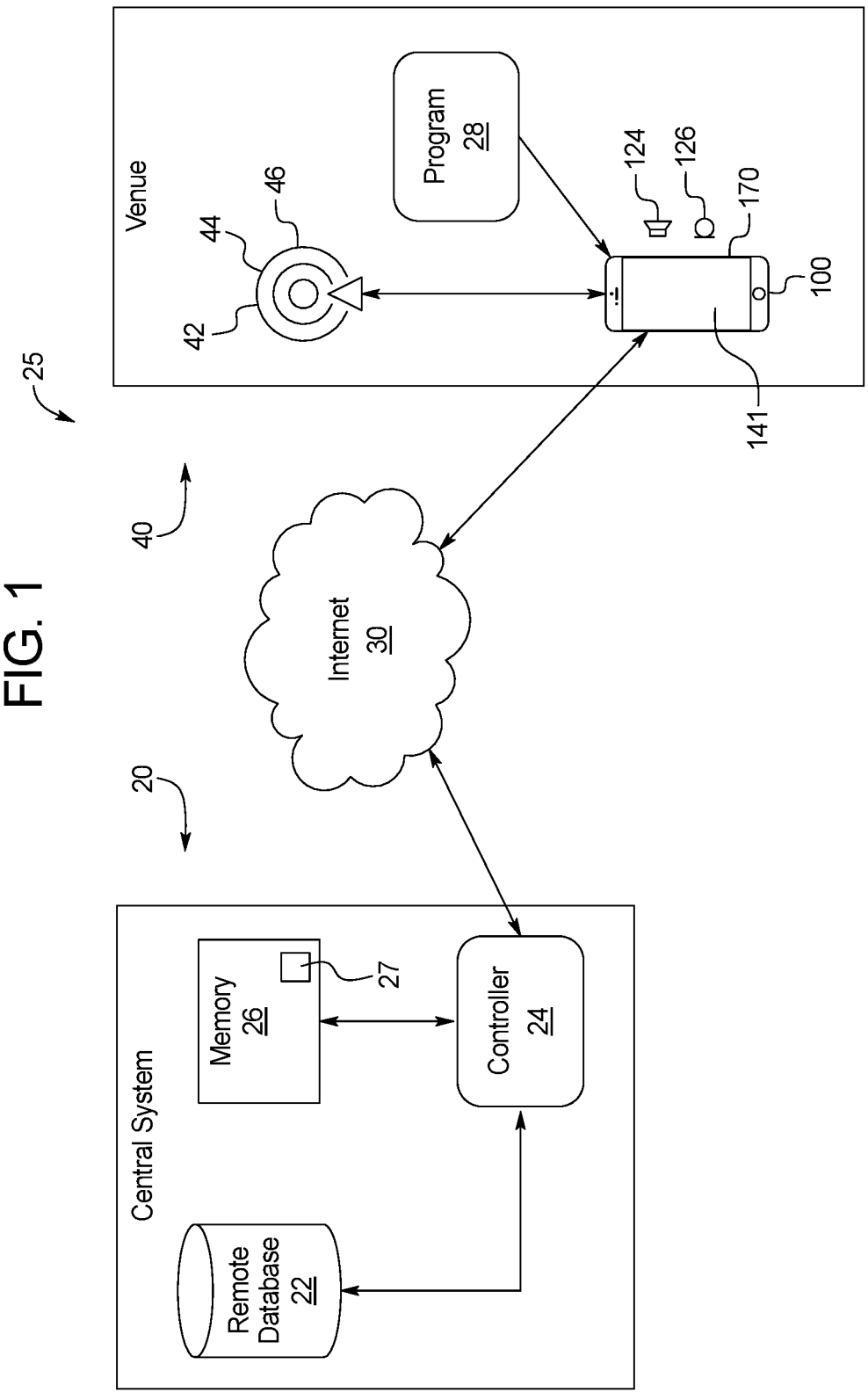
FIG. 1 is a schematic diagram illustrating the components of the system.

FIG. 1 is a schematic diagram illustrating an exemplary system for an audio navigation system 25. In an embodiment, the audio navigation system 25 may be embodied as a mobile device application 141 (FIG. 2) that may be run on a mobile device 100, such as a smartphone. A central system 20 may provide navigational functionality by communicating with the mobile device 100 via a controller 24. A central system 20 may be a server including software instructions 27 run by a controller 24 that may communicate with mobile devices 100 through the Internet 30. A remote database 22 may be included in the central system 20 to store data, such as routing data and information relating to a venue 40. Wired or wireless communication links relay communication between the mobile devices 100 and the Internet 30.

In an embodiment, the mobile device 100 may execute a mobile device application 141 that provides a program user interface 170 for the audio navigation system 25. The mobile device application 141 may be executed by the mobile device 100 to enable users to receive location-based information and turn-by-turn directions.

The mobile device 100 may include one or more audio outputs 124 (e.g., speaker, headphone jack), a microphone 126, a touchscreen interface 134, and a mobile device application 141 (FIG. 2) stored in a memory 138. The user may be able to interact with the mobile device application 141 through the program user interface 170 or through speaking commands via the microphone 126. In an embodiment, a user may be able to insert microphone-enabled headphones into the audio output 134 to listen to announcements and speak commands. The mobile device application 141 may provide a user with a plurality of features, including their current location and information pertaining to their current location, such as a description of the layout and function of the current location.

The mobile device application 141 may include display screens that are adapted to be used by users with visual impairment. In an embodiment, the screens may use large, easily readable text. The colors of particular screens may convey operation even if the user cannot fully read the displayed text. The screens may use high contrast icons and colors to convey choices regarding the functionality. It may be possible to attach a Braille display to the mobile device 100 in order to provide increased accessibility to the user.

The beacon 42 may be provided in the form of a Bluetooth low energy proximity device that may be detected by the mobile device 100. For example, the beacon 42 may be a commercially available unit, such as those that use iBeacon technology. The beacon 42 may include a unique identifier 44 and may have a physical location 46. When located in the venue 40, the beacon 42 may continuously transmits its unique identifier through wireless means such the mobile device 100 may detect the beacon 42 and receive the unique identifier 44. In some embodiments, the beacon 42 may be attached to points of interest that are not fixed. For example, a beacon 42 may be attached to a school bus to alert a child when the bus has arrived.

The remote database 22 may store the unique identifier 44 of the beacon 42 along with the corresponding physical location 46 of the beacon 42. The remote database may also store the latest updated turn-by-turn navigation instructions and location information. The remote database 22 may be accessed over the Internet 30 to permit the mobile device 100 to lookup the physical location 46 of the encountered beacon 42 via the unique identifier 44 and each venue 40 may have its own login ID to login and manage their own information.

O&M specialists may access the remote database 22 through a web portal or administration functionality of the system. Additionally, the audio navigation system 25 system may interface with other databases, for example, via an API, to permit the use of additional navigation information. For example, the system may interoperate with databases for grocery coupons, airport gate information, etc.

The audio navigation system 25 may have the ability to provide navigational instructions to the user through the mobile device application 141. When in navigation mode, the audio navigation system 25 may provide turn-by-turn directions while continuously updating the user on the their present location via encountered beacons 42 that may be attached to a landmarks, such as a particular store in a shopping mall. As the user follows the turn-by-turn directions and passes various landmarks, the audio navigation system 25 may announce the landmark to the user. In an embodiment, the turn-by-turn directions may be calculated by the central system 20 or by the mobile device 100 via the mobile device application 141.

The audio navigation system 25 may have the ability to recalculate the route in a situation where the user deviates from the calculated route. The audio navigation system 25 may learn of a user deviation through the mobile device 100 encountering the beacon 42 that is not along the calculated route. For example, upon calculating a route, the audio navigation system 25 may know which beacons a user will encounter on their route. If the user encounters a beacon, which is not on the calculated route, the audio navigation system 25 will alert the user of their deviation. At this point, the audio navigation system 25 may calculate a new route from the user's current location to the user to their desired destination.

Figure 2:
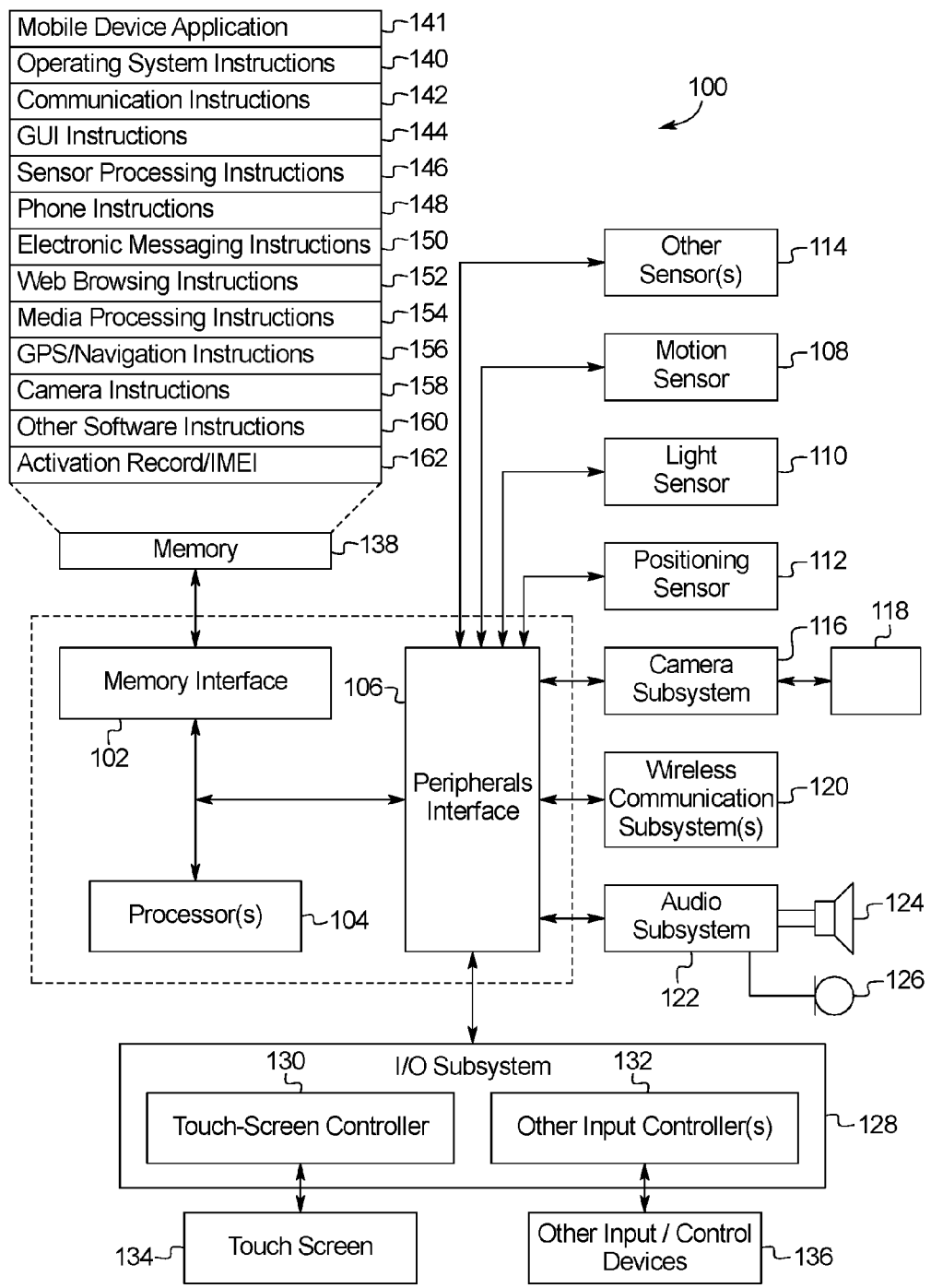
FIG. 2 block diagram representation of an implementation of a mobile device as illustrated in the system of FIG. 1.

FIG. 2 is a block diagram representation of an example implementation of an example mobile device 100 of the audio navigation system 25. As shown in FIG. 2, in an embodiment, the audio navigation system 25 may include a mobile device application 141 that may be installed on the mobile device 100. The mobile device 100 may be mobile devices 100 such as an iOS®, Android®, Windows® or other commercially available or special purpose mobile device 100.

Figure 3:
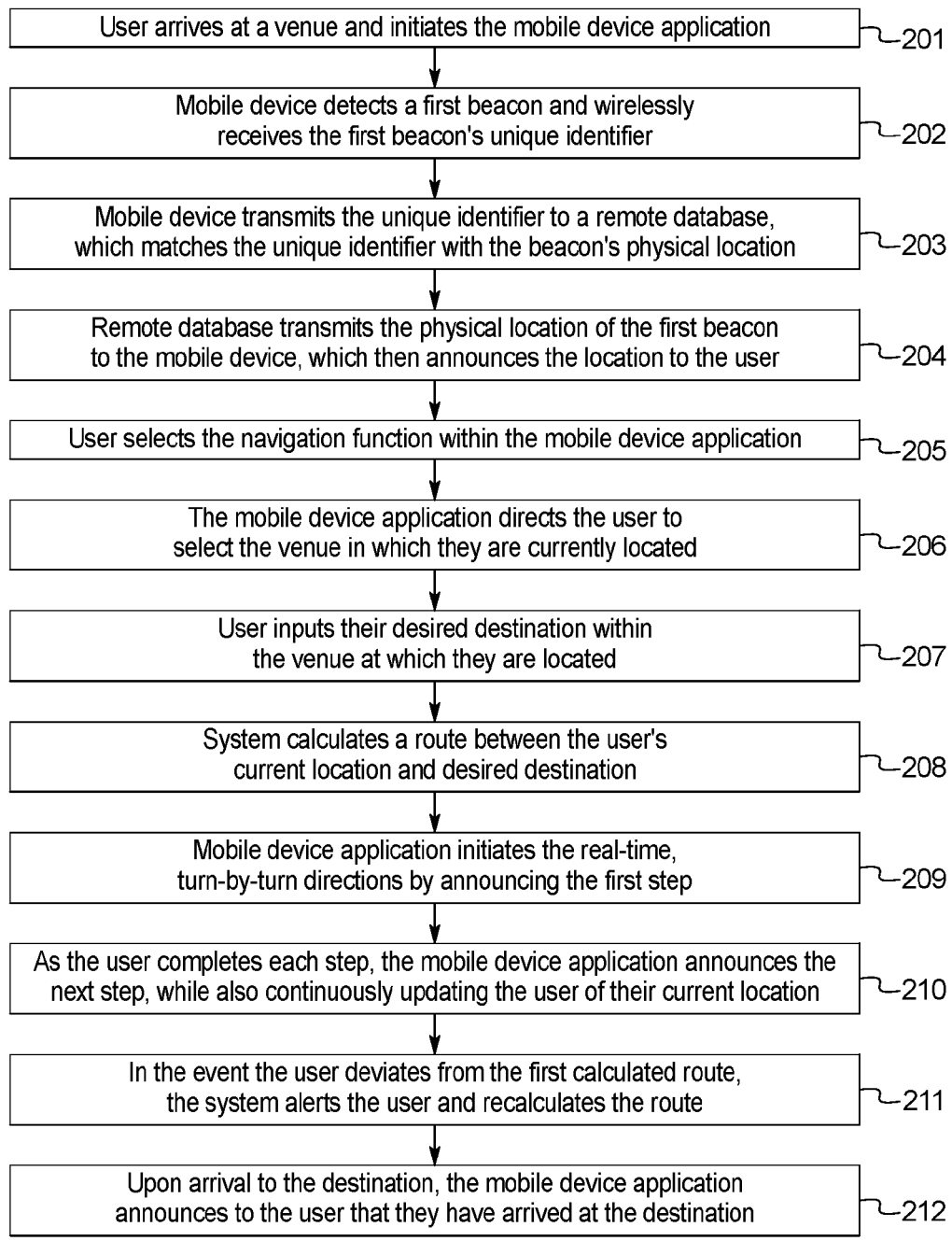
FIG. 3 is a flow chart of an exemplary use case for the system of FIG. 1.

FIG. 3 illustrates a flow chart of an exemplary use case for the audio navigation system 25. Beginning at step 201, the user may enter into a venue 40 with the mobile device 100. Upon entering the venue 40, the user may initiate the mobile device application 141 by, for example, selecting an icon, via the user interface 170 that represents the mobile device application 141, or by speaking a command into the mobile device 100 via the microphone 126.

Next, at step 202, the user may travel within a vicinity of the beacon 42 such that the mobile device 100 encounters and detects the beacon 42, which may be continuously broadcasting its unique identifier. Upon detection, the mobile device 100 may wirelessly receive the unique identifier 44.

At step 203, the mobile device 100, may transmit the unique identifier 44, via the Internet 30, to the central system 20, which may include a remote database 22. The remote database 22 may store the unique identifier 44 and the physical location 46 of the beacon 42. The remote database 22 may match the unique identifier 44 with the physical location 46 of the beacon 42.

Next, at step 204, the central system 20 may transmit the physical location 46 of the beacon 42, via the Internet 30, to the mobile device 100, at which point the mobile device application may announce the physical location 46 to the user via the audio output 124.

When the user learns of their current location, the user may then desire to travel to another location within the venue 40. At step 205, the user may access the navigation function of the audio navigation system 25. In order to access the navigation function of the audio navigation system 25, the mobile device application 141 may provide a "take me to" button 401 (FIG. 5), that, when selected by the user, provides the user with navigation functionality. The user may also access the navigation function by speaking a command, such as "directions."

Upon accessing the navigation function, at step 206, the mobile device application 141 may display a list of venues and may prompt the user to select the venue 40 at which they are currently located (e.g. shopping mall, airport, school). For example, if the user's current location is at a particular shopping mall, the user will select that particular shopping mall as their current venue 40.

Figure 8:
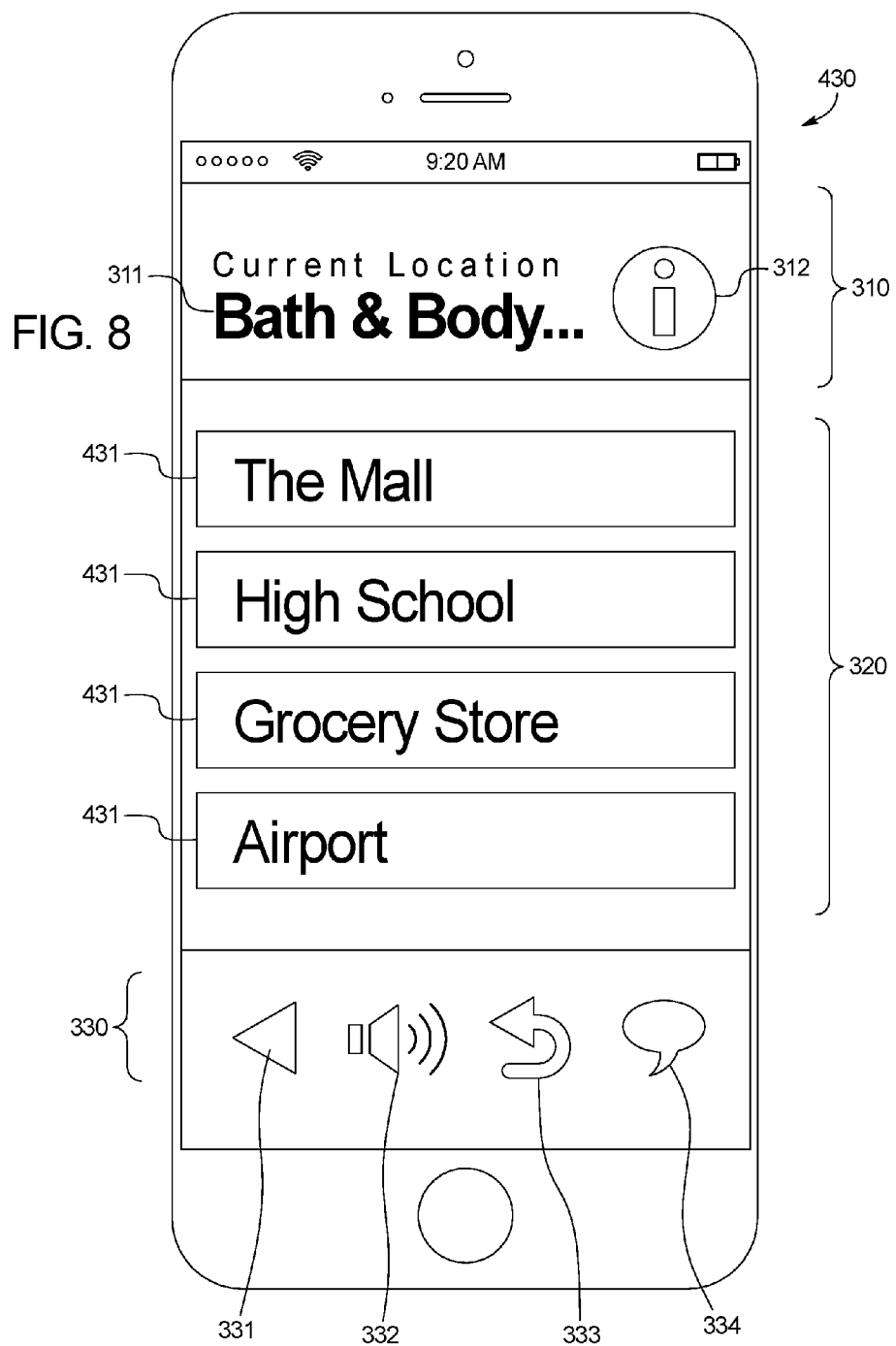
FIG. 8 is an exemplary user interface of the "venues" screen for the mobile device application of FIG. 1.

In some embodiments, the audio navigation system 25 may already know the user's venue, and thus, step 206 may not be necessary. In some embodiments, a user may have previously selected the venue 40 via a "venues" screen (FIG. 8). In another embodiment, the audio navigation system 25 may be aware of the user's venue 40 via a GPS unit located within user's mobile device 100. In yet, another embodiment, the audio navigation system 25 may be aware of the user's venue 40 via the encountered beacon 42. For example, when the central system 20 receives the unique identifier 44 and matches it with the physical location 46, the physical location 46 may include the landmark on which the beacon 42 is attached along with the venue 40 it is located. In the circumstance that the audio navigation system 25 has previous knowledge of the user's venue 40, the audio navigation system 25 may skip step 206 and go directly from step 205 to step 207.

At step 207, the user may select their desired destination via the mobile device application 141. When prompted to choose a destination, a list of venue specific locations may be displayed on the screen and the user may have the option to list them alphabetically, by distance, or by category. The user may also speak their desired destination via the microphone 126 and the mobile device 100 may use speech-to-text translation software to obtain a text name of the desired destination for transmission to the central system 20.

At step 208, the audio navigation system 25 may calculate a route between the user's current location and the user's desired destination. The route may be calculated by the central system 20 and sent to the mobile device 100 via the controller 24 or the route may be calculated on the mobile device 100. When routing the user, the audio navigation system 25 may use predefined routes that may be set up by O&M specialists using the audio navigation system 25, or the audio navigation system 25 may generate routes dynamically.

At step 209, the mobile device application 141 may initiate the real-time, turn-by-turn directions by announcing the first step via the audio output 124 of the mobile device 100. In step 210, the mobile device application 141 may announce the next instruction when the user completes the previous instruction. Additionally, the mobile device application 141 may continuously update the user of their current location by announcing the physical location (e.g. landmark name) of beacons along the route. Upon announcing the user's current location along a route, the audio navigation system 25 may also update the current direction. For example, if the current direction is "walk 500 feet and turn right at Starbucks," and the user encounters a beacon at a Yankee Candle halfway through the direction, the audio navigation system 25 may update the direction and announce, "you are at Yankee Candle, walk 250 feet and turn right at Starbucks."

Step 211 provides for a circumstance when a user deviates from the calculated route. The audio navigation system 25 may learn of a deviation if the user encounters a beacon 42 not along the calculated route. If the user deviates from the calculated route, the mobile device application 141 will immediately alert the user and the audio navigation system 25 will calculate a new route from the user's current location. Lastly, in step 212, the mobile device application 141 will make an announcement when the user reaches the desired location.

Figure 4:
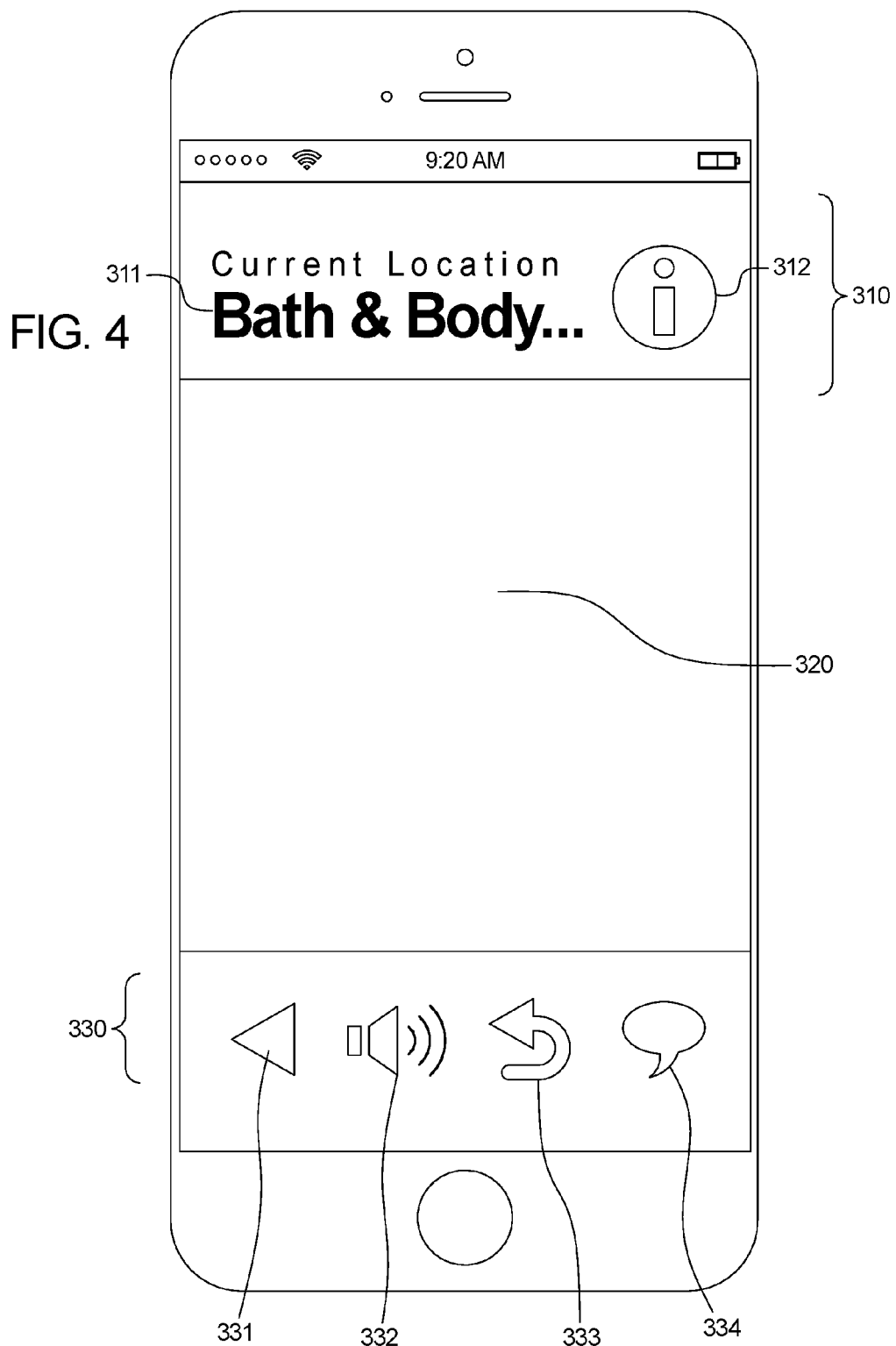
FIG. 4 is a shows an exemplary wireframe template for the mobile device application of FIG. 1.

FIG. 4 is an exemplary layout of the screen for the mobile device application 141. The screen may include a top section 310, middle section 320, and bottom section 330. The top section 310 and bottom section 330 of the screen may be kept constant while a middle section 320 may change in response to user actions. The middle section 220 may change to dynamically reflect the currently selected functionality.

Figure 7:
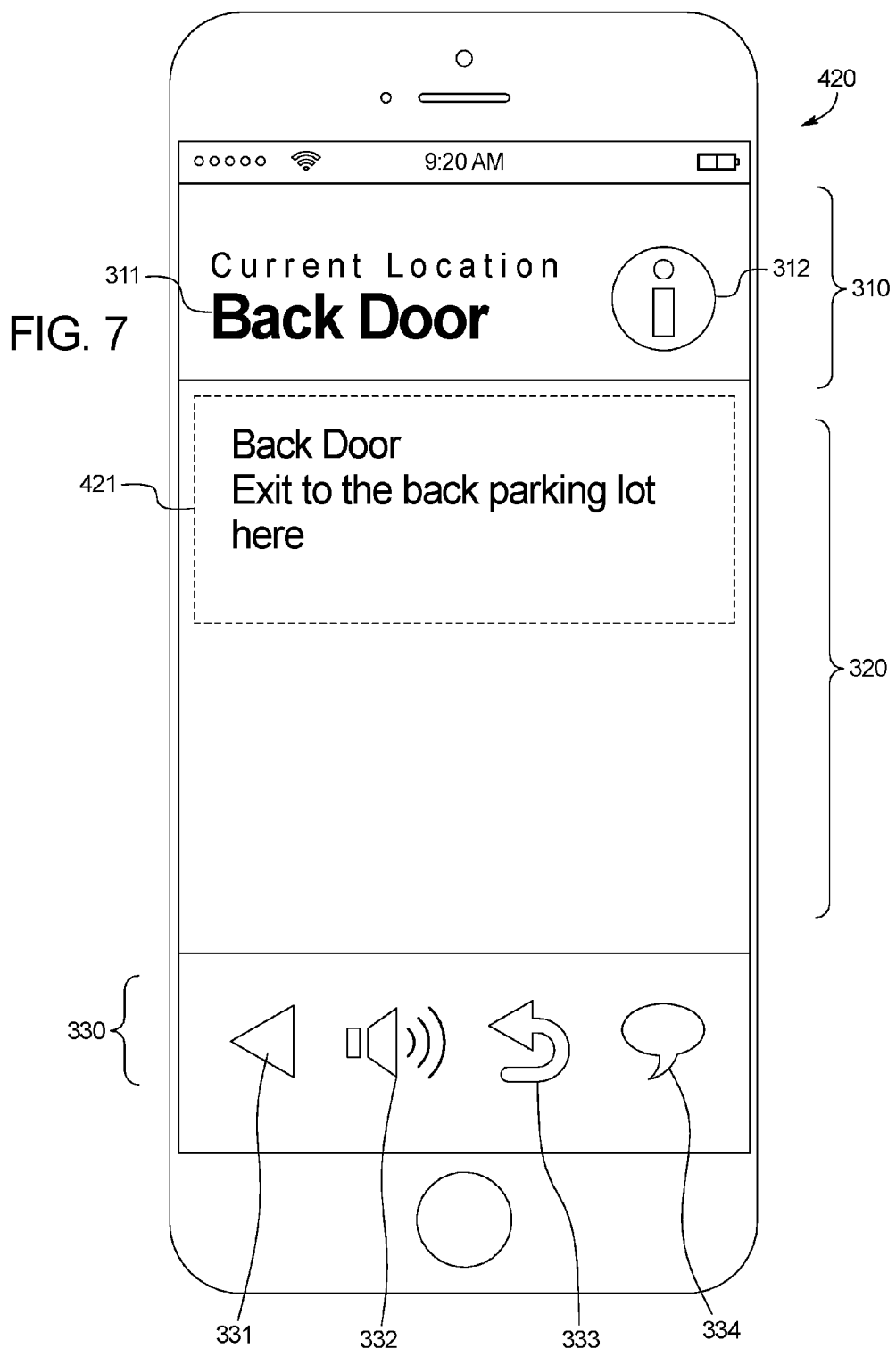
FIG. 7 is an exemplary user interface of the "more Info" screen for the mobile device application of FIG. 1.

The top section 310 may include a "current location" textbox 311 that displays the user's current location. The user's current location may be determined by a reference to the closest beacon 42. As a user moves through a venue 40 and the closest beacon 42 to the user changes, the mobile device 141 may announce the new closest beacon 42 and update the "current location" textbox 311. The announcement may be automatic and triggered by the change; thus, the user does not need to press a button on the mobile device 141 to learn if the closest beacon 42 has changed. The top section 210 may include an "i" icon 312 that permits the user to access a "more info" screen 420 (FIG. 7).

The bottom section 330 may include icons that permit the user to access various functionality of the audio navigation system 25. The icons may include a: "go back" icon 331, "mute/un-mute" icon 332, "repeat" icon 333, and "speak" icon 334. The "go back" icon 331 takes the user back to the most previously accessed menu item. The "mute/un-mute" icon 332 may be toggled to mute or un-mute the audio announcements, such as the announcements of the nearest beacon 44. The "repeat" icon 333 triggers the mobile device application 141 to repeat the most recent audio announcement. The "speak" icon 334 permits the user to speak an audio command, such as, "take me to Bergner's." The audio command may be spoken into the mobile device 100 via the microphone 126.

Figure 5:
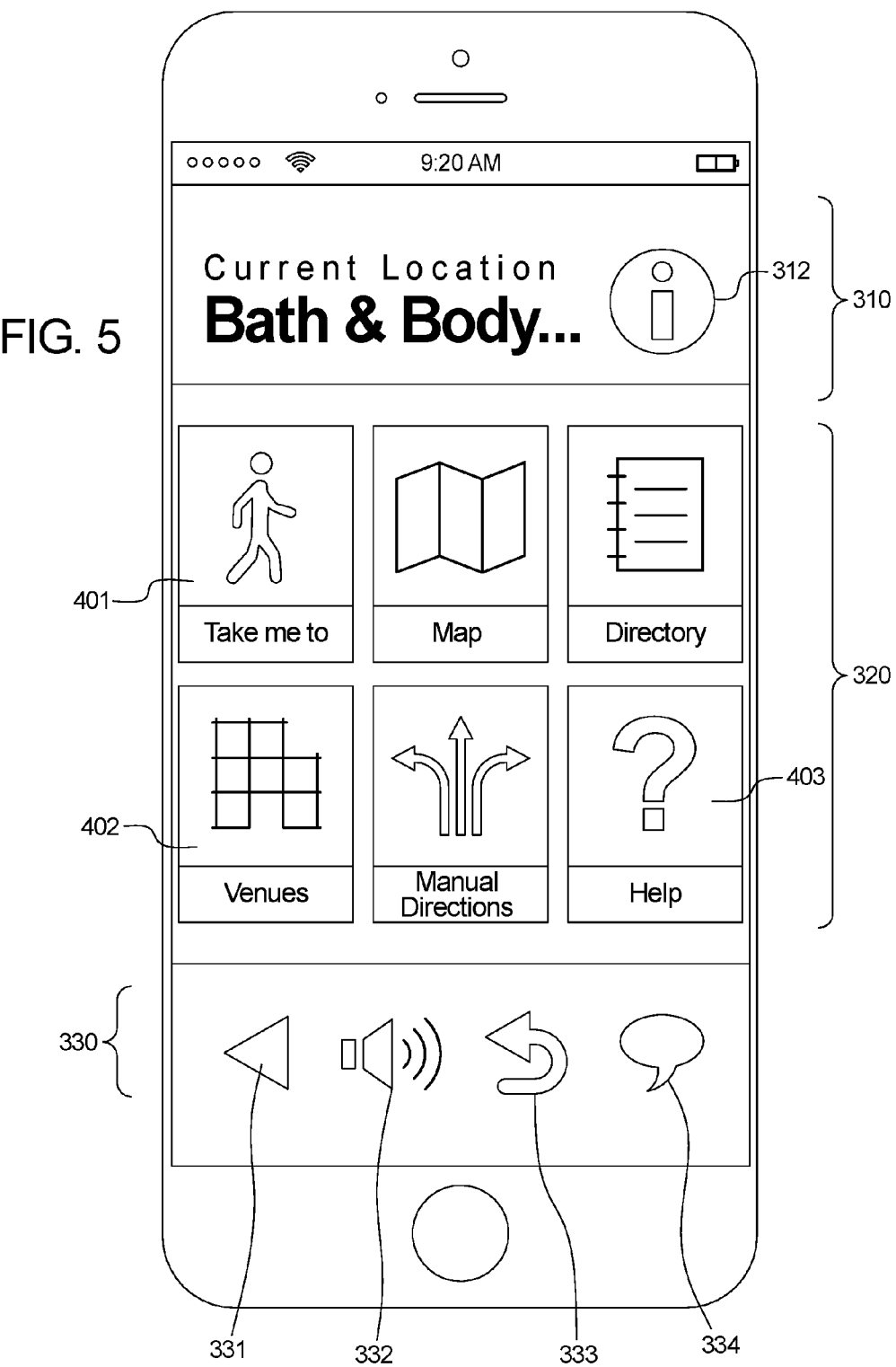
FIG. 5 is an exemplary user interface of the "Main Menu" screen for the mobile device application of FIG. 1.

FIG. 5 illustrates an exemplary layout of the main menu screen 400 for the mobile device application 141. The main menu screen 400 may include the top section 310, the middle section 320, and the bottom section 330. The middle section 320 may include a "take me to" button 401, a "venues" button 402, and a "help" button 403.

The "take me to" button 401 directs the user to the "choose a destination" screen (FIG. 9), from which the user can input a destination and receive navigational instructions. The "venues" button 312 directs the user to the "venues" screen (FIG. 8). The "help" button 413 directs the user to a "help" screen (FIG. 6)

Figure 6:
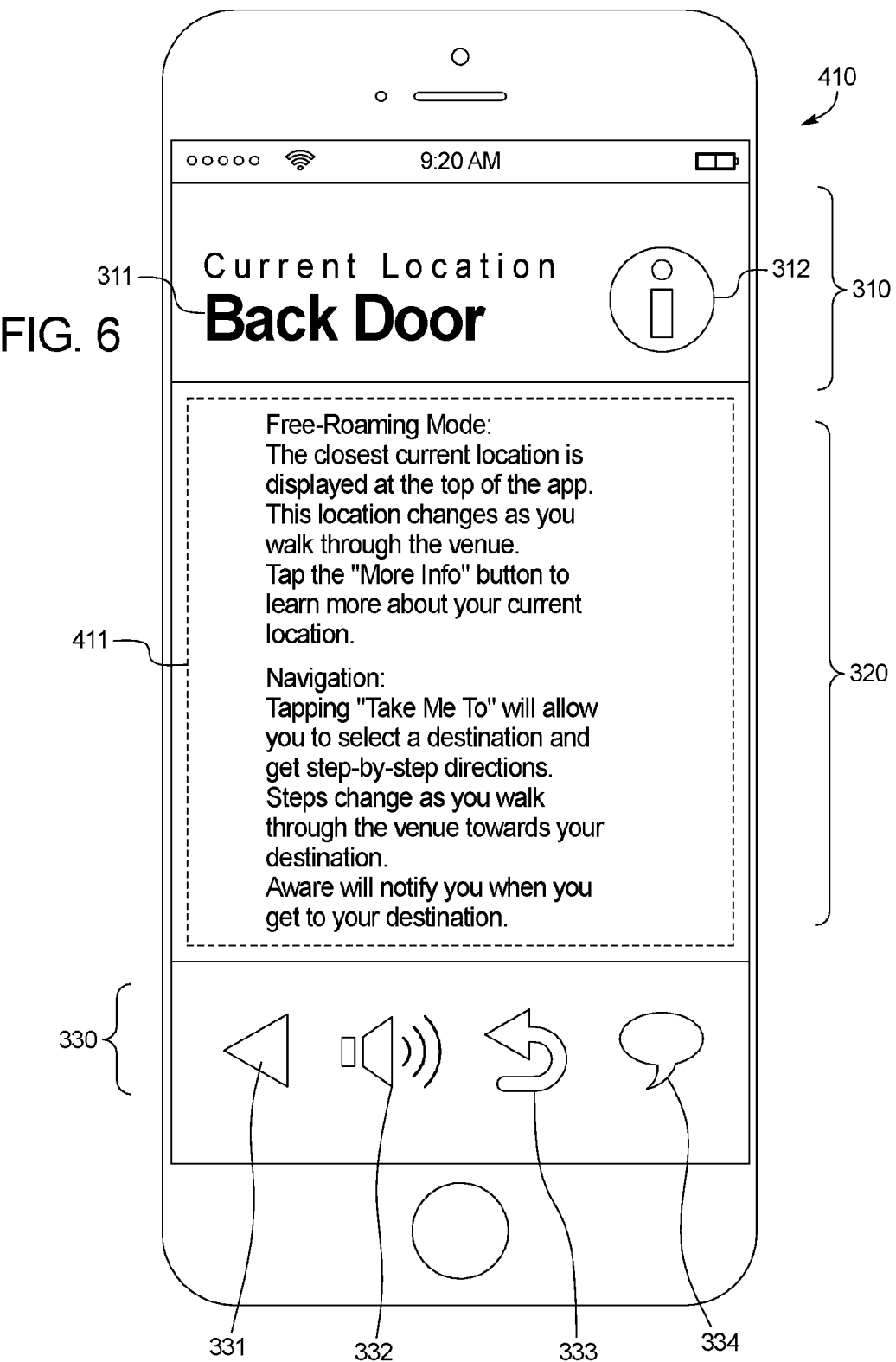
FIG. 6 is an exemplary user interface of the "help" screen for the mobile device application of FIG. 1.

FIG. 6 illustrates an exemplary layout of the "help" screen 410. The user may access the "help" screen by selecting the "help" button 403 on the "main menu" screen 400 or by selecting the "speak" icon 334 and speaking a command such as "help." The "help" screen 410 may include the top section 310, the middle section 320, and the bottom section 330. The top section 310 may include the "current location" textbox 311 and "more info" icon 312. The middle section 320 may include a "help" text area 411 that may provide information on how to use the audio navigation system 25 and mobile device application 141. The bottom section 330 may include the icons 331, 332, 333, and 334. The user may select the "speak" icon 334 and speak a command such that the mobile device application 141 announces the text in the "help" text area 411. The announcement may be heard by the user through the audio output 124.

FIG. 7 illustrates an exemplary layout of the "more info" screen 420. The "more info" screen 420 may include the top section 310, the middle section 320, and the bottom section 330. The top section 310 may include the "current location" textbox 311 and "more info" icon 312. The middle section 320 may include a "more info" text area 421 that provides information on the user's current location, such as the purpose of the location. The bottom section 330 may include the icons 331, 332, 333, and 334.

To access the "more info" screen, the user may select the "more info" icon 312, or the user may select the "speak" icon 335 speak a command such as "tell me more" or "more info." In some embodiments, an audible cue may be played to indicate that there is an announcement or a promotion at the location. This will permit venues to set announcements or advertisements and define when and where to play the audible cue, for example, by setting a time frame to play it and associating it with a certain beacon location. For example, if the user walks by a store in a shopping mall, the "more info" screen 420 may display a message indicating that there is an active sale at the store along with making an announcement via the audio output 124.

FIG. 8 illustrates an exemplary layout of the "venues" screen 430. The user may access the "venues" screen by selecting the "venues" button 402 on the "main menu" screen 400 or by selecting the "speak" icon 334 and speaking a command such as "venues." The "venues" screen 430 allows the user to select the venue of their current location. The "venues" screen 430 may include the top section 310, the middle section 320, and the bottom section 330. The top section 310 may include the "current location" textbox 311 and "more info" icon 312. The middle section 320 may include one or more "venue" buttons 431. The bottom section 330 may include the icons 331, 332, 333, and 334. Upon selecting a venue button 431, the user may be directed to the "choose a destination" screen (FIG. 9).

Figure 9:
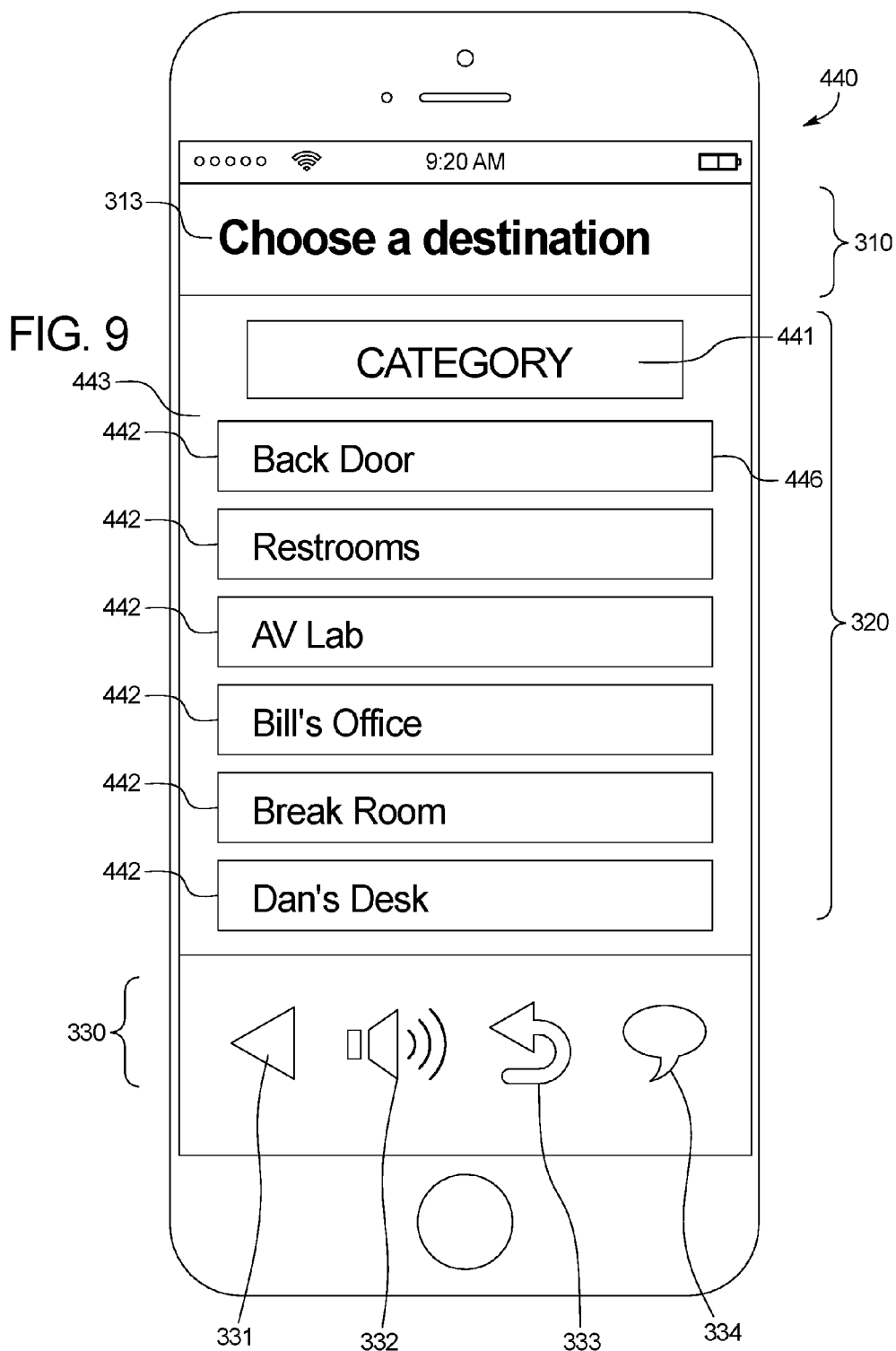
FIG. 9 an exemplary user interface of the "choose a destination" screen for the mobile device application of FIG. 1.

FIG. 9 illustrates an exemplary layout of the "choose a destination" screen 440. The user may access the "choose a destination" screen by selecting the "take me to" button 403 on the "main menu" screen 400 or by selecting the "speak" icon 334 and speaking a command such as "choose a destination" The "choose a destination" screen 430 may display a list of destinations for the venue 40 at which the user is present and may allow the user to select a destination for which they desire to receive directions to. In an embodiment, as shown, the list of destinations may be ordered to include the nearest exit at the top of list with the nearest restroom listed next.

The "choose a destination" screen 440 may include the top section 310, the middle section 320, and the bottom section 330. The top section 310 may include a "title" text area 313, which may display the title of the active screen. In some embodiments, the top section 310 may include the "current location" textbox 311 and "more info" icon 312. The bottom section 330 may include the icons 331, 332, 333, and 334.

The middle section 320 may include a "category" button 441 and one or more "destination" buttons 442. The "category" button 441 allows the user to display destinations for a specific category, such as exits. The user may have the ability to sort the destinations alphabetically or by distance. The user may switch between the lists. When sorting by distance, the nearest exit 446 may always be shown first. Additionally, all "destination" buttons 442 that may be an exit may include a colored outline 443 to further distinguish exit destinations from non-exit destinations. Upon selecting a destination by speaking the destination or hitting the destination button 442, the user will be provided with turn-by-turn directions.

Figure 10:
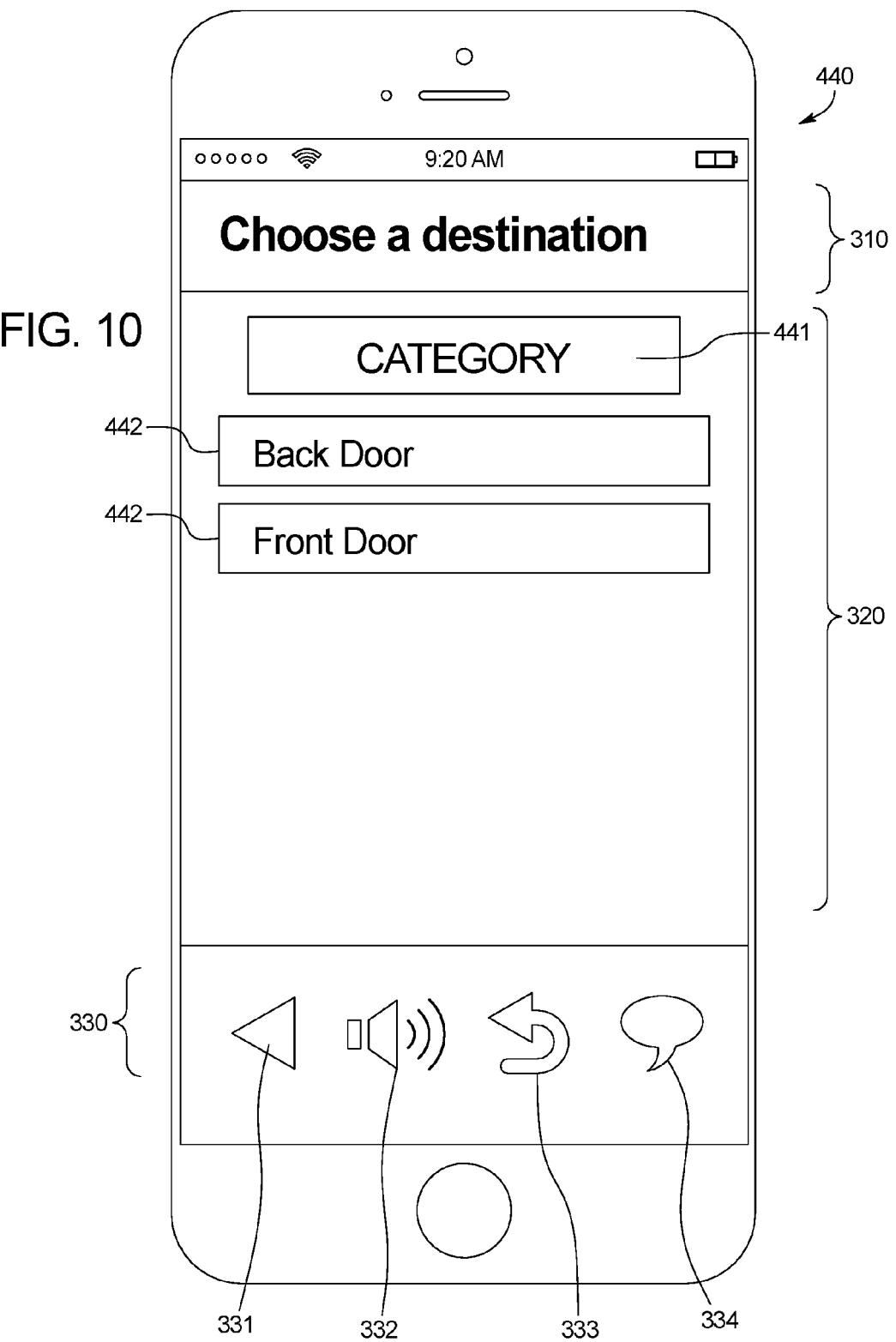
FIG. 10 an exemplary user interface of the "choose a destination" screen for the mobile device application of FIG. 1.

FIG. 10 is variation of the "choose a destination screen" 440, wherein the user has selected an "exit" category such that the middle section 320 only displays exits as destination buttons 442. The closest exit to the user may be listed first.

Figure 11:
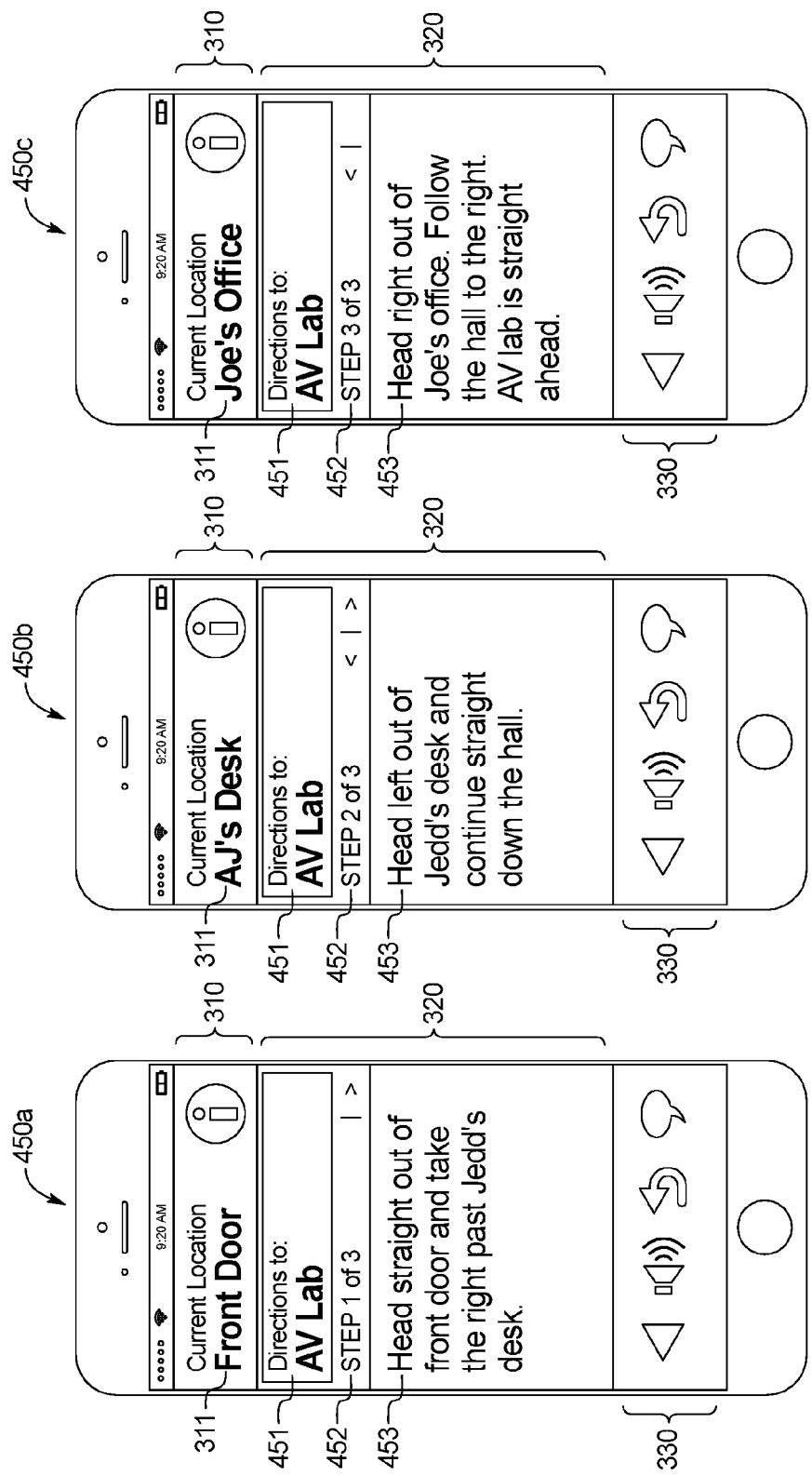
FIG. 11 is an exemplary user interface of the turn-by-turn directions feature of the system of FIG. 1.

FIG. 11 illustrates exemplary turn-by-turn directions between the user's current location and desired destination they may have entered on the "choose a destination" screen 440. A "step one" screen 450a displays the first step, a "step two" screen displays the second step 450b, and a "step three" screen 450c displays the third step. The screens 450a, 450b, and 450c may all include a top section 310, middle section 320, and bottom section 330. The top section 310 may include the "current location" text area 311. The middle section 320 may include a destination text area 451, a step text area 452, and a directions text area 453.

The current location text area 311 will dynamically adjust the user's current location as they move along the route. The destination text area 451 may include text indicating the user's desired destination. The step text area 452 may display text indicating what step the user is on regarding the turn-by-turn directions. The directions text area 453 may include written turn-by-turn directions for the specific step the user is in the process of completing.

At each step, the user may be at a different location, thus the text in the current location text area 311 may dynamically change and display the user's current location. For example, in step one screen 450a, the user's current location may be a front door and thus, the current location text area 311 may display "Front Door." As the user completes step one, the step one screen 450a may change to the step two screen 450b. In the step two, the user's current location may change to a new location, such as "AJ's desk." Therefore, the current location text area 311 may change from "Front Door" as seen in screen 450a to "AJ's Desk" as seen in screen 450b.

Figure 12:
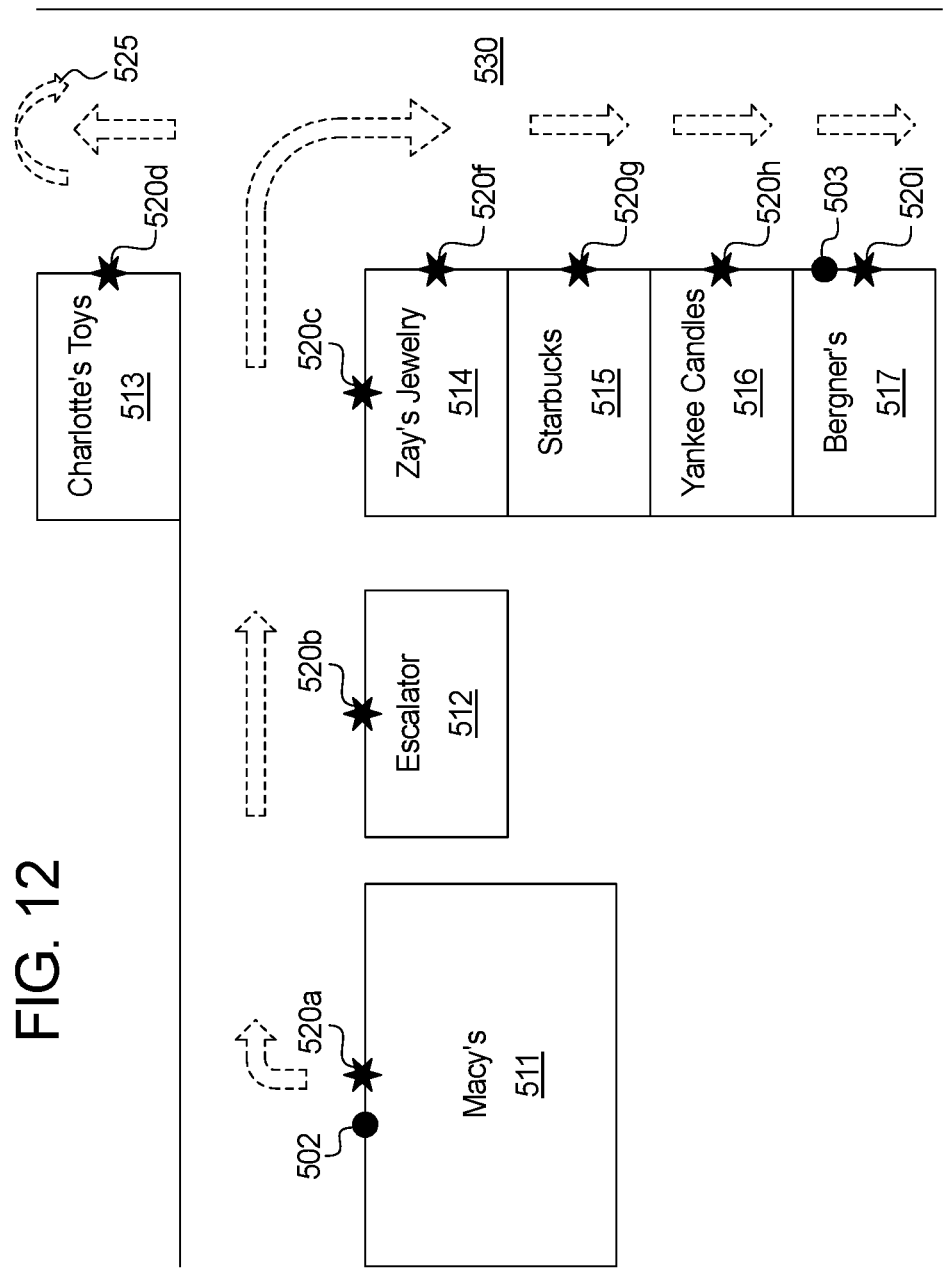
FIG. 12 is a hypothetical map illustrating the movement of a user through a venue using the system of FIG. 1.

FIG. 12 is a hypothetical map illustrating exemplary functionality of the disclosed invention. In the hypothetical use of case shown in FIG. 12 the user's current location 502 is at a mall at a "Macy's" 511 and their desired location 503 is at a "Berger's" 517. First, the user must select of speak a selection of "Bergner's" as the destination. The application may announce the directions to the destination in segments in order to direct the user by way of nearby waypoints as determined by beacons 520a, 520b, 520c, 520d, 520f, 520g, 520h, and 520i. For example, the application may begin with the instructions at beacon 520a:

"Keep Macy's on your right and continue down the hallway passing the escalator, until you reach Zay's jewelry on your right, then turn 90 degrees right."

In an embodiment, all announced instructions may also be displayed in the directions text area 453. As the user passes additional landmarks, the application may announce the landmark to help the user develop a mental map of the space. For example, if the user passes an escalator 512, the mobile device application 141 may announce at beacon 520b that:

"Escalator to the second floor."

The application may then pick up a next beacon 520c at "Zay's Jewelry" 514 and give the user the next segment of directions. For example, upon arriving at beacon 520c, the mobile device application 141 may instruct:

"Keep Zay's Jewerly to your right and continue east until the end of the hallway, passing Starbucks Coffee and Yankee Candles."

In the event that the user ends up in the wrong quadrant, the application may detect an unexpected beacon and detect that the user is not following the suggested route. The audio navigation system 25 may then recalculate the route from the user's current location to the preselected destination and give a new route. The mobile device 100 may detect a beacon 520d at "Charlotte's Toys" 513 and give the user updated direction to their desired destination 503 at "Bergner's" 517. For example, the mobile device application 141 may instruct:

"You are currently heading west away from Bergner's, your destination. Charlotte's Toys is on your left. Please turn around and head east passing Starbucks and Yankee Candles."

The user may then turn east at a location 525 and head down an east hallway 530. As the user then approaches beacon 520f at "Zay's Jewelry" 514. The mobile device application 141 may then give the user the next segment of instructions:

"Keep Zay's Jewelry to your right and continue east until the end of the hallway, passing Starbucks and Yankee Candles."

As the user follows the instructions walking down the east hallway, the application may continue announcing landmarks as the user passes them. For example, as the user passes beacon 520g, the mobile device application 141 may announce:

"Starbucks."

Then, at beacon 520h, the mobile device application 141 may announce:

"Yankee Candles."

Upon arrival to the user's desired destination 503, the mobile device application 141 may announce:

"You have arrived at your destination, Bergner's."

Figure 13:
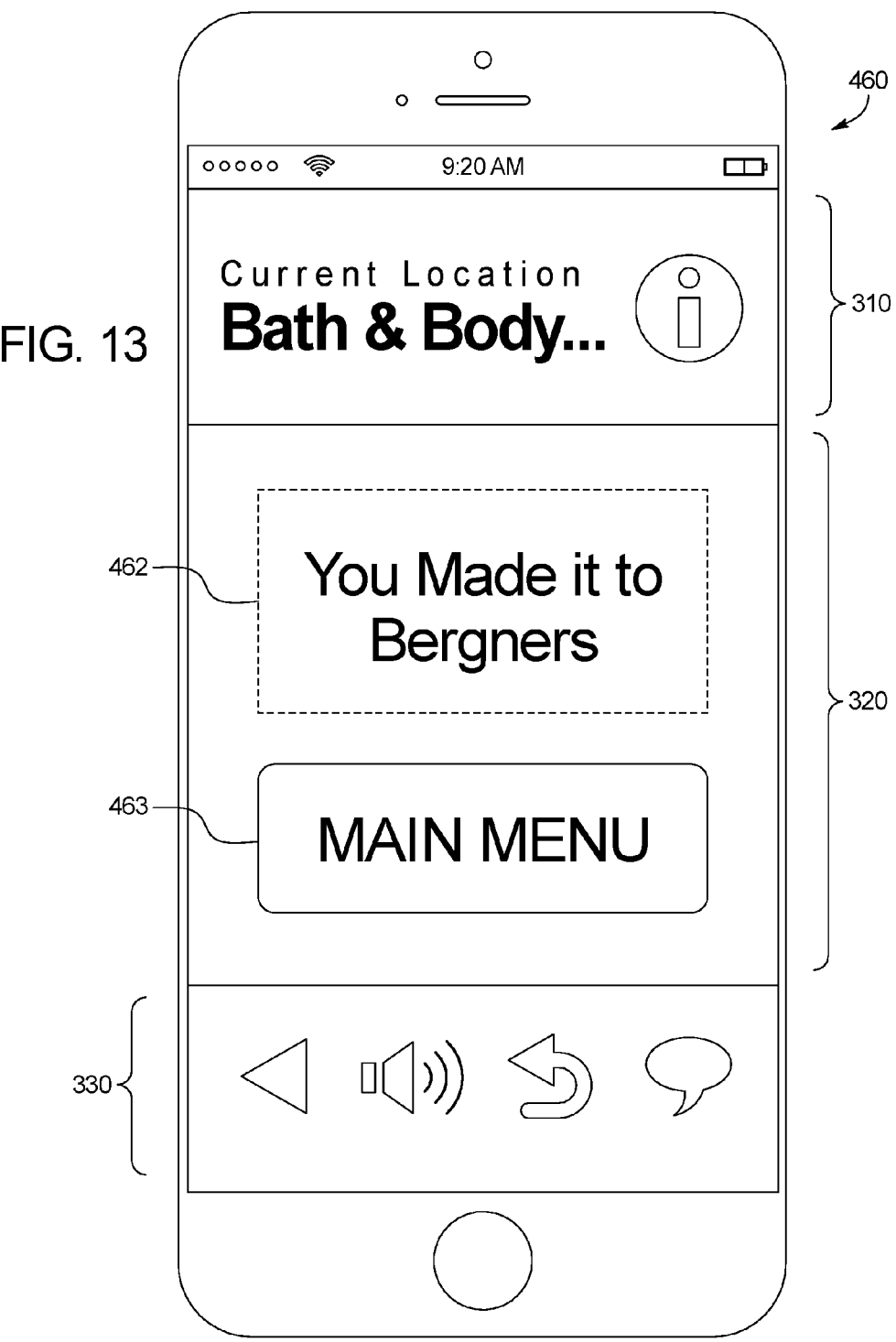
FIG. 13 illustrates an exemplary user interface of the "Arrival" screen for the mobile device application of FIG. 1.

In addition to announcing the arrival, the mobile device application 141 may update the user interface 170 to show the current location. FIG. 13 illustrates an exemplary layout of an "Arrival Screen" 460, which generally displays a message indicating to the user that they have arrived at their destination. The "Arrival Screen" 460 may include the top section 310, middle section 320, and bottom section 330.

The middle section 320 may include a text display area 462, which includes a message that indicates to the user that they have arrived at their destination. The middle section 320 may also include a "Main Menu" button 463, which when selected, directs the user back to the "Main Menu" screen 400. The font may be large to permit it to be read by users with sufficient visual ability to read large fonts. Additionally, the screen may be colored to represent that the user has arrived at the destination.

In an embodiment, directions, such as those announced by the application 141 and displayed in the direction text area 453, may be written by an administrator of the database 22. This may permit the addition of instructions more sophisticated than possible by generating the instructions algorithmically.

However, manual entry of instructions can be extremely time-consuming. In the simplest implementation where directions are provided from each beacon 42 to every other beacon 42, the number of needed directions to provide grows approximately as the square of the number of beacons 42. For example, for five beacons 42, twenty directions must be provided, but for ten beacons 42, ninety directions must be provided. Thus, there is a need for the audio navigation system 25 to minimize the need for manually creating instructions between beacons 42.

Figure 14:
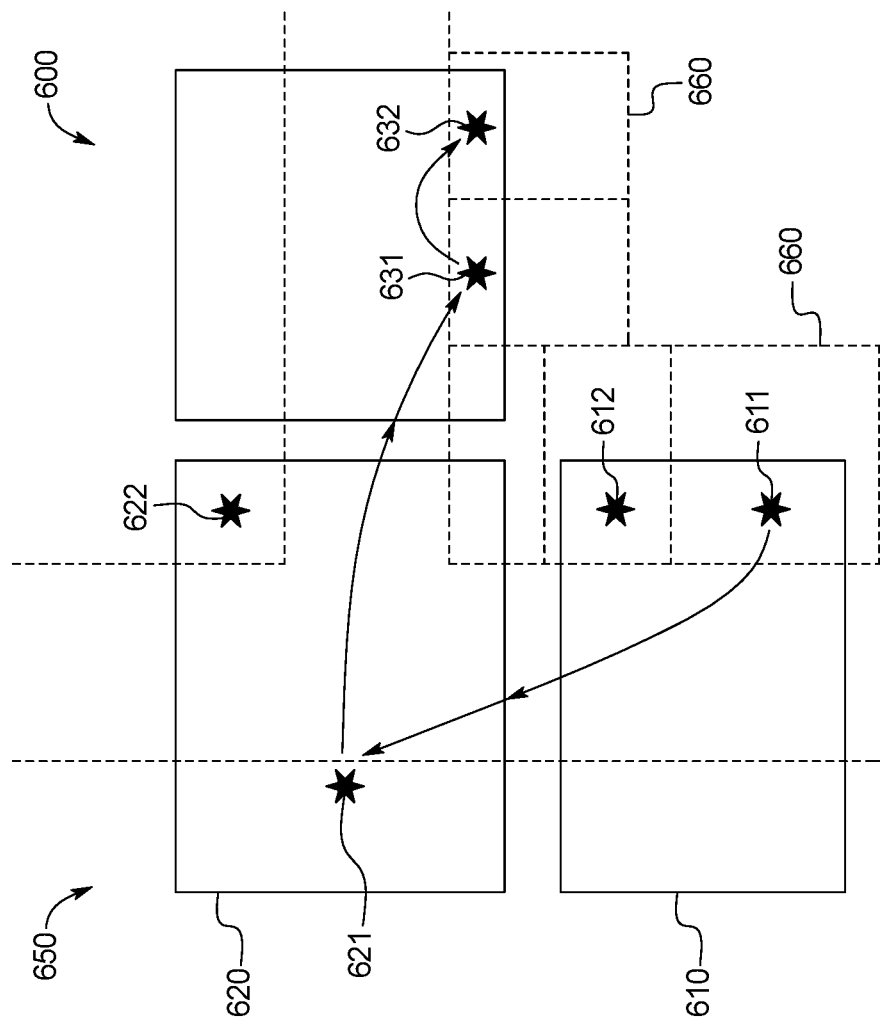
FIG. 14 illustrates a hypothetical map illustrating the movement of a user through a venue defined with quadrants using the system of FIG. 1.

Accordingly, in an embodiment, beacons 42 are clustered into quadrants 650 (FIG. 14) to reduce the number of directions needed to be manually provided. In an embodiment, the administrator may provide sufficient directions for complete navigation of a venue 40 by providing directions from each beacon 42 to each quadrant 650 adjacent to its own, and directions from each beacon 42 to all other beacons 42 in its quadrant 650. As a user navigates along a route, the application 141 may provide directions from the nearest beacon 42 to the next quadrant 650, and upon arriving in that quadrant, once again detect the closes beacon 42 and provide directions to the next quadrant 650 along the route, and so on until the user arrives in the quadrant 650 containing the destination. The application 141 may then provide direct the user from beacon 42 to beacon 42 until the user arrives her destination. The application 141 then FIG. 14 is a hypothetical map 600 illustrating an example of navigation involving quadrants 650. The map 600 includes three quadrants 610, 620, and 630. Each quadrant contains two beacons 42: beacons 661 and 612 are in quadrant 610; beacons 620 and 621 are in quadrant 620; and beacons 631 and 632 are in quadrant 630. The user begins at beacon 671 and wants to travel to beacon 632. The application 141 first prompts the user with directions to travel from beacon 611 to quadrant 620. The user travels to quadrant 620, and upon arriving, the application 141 detects beacon 621. The application than prompts the user with directions from beacon 621 to quadrant 630. Upon arrival in quadrant 630, the application 141 detects beacon 631. The application 141 may finally direct the user from beacon 631 to beacon 632, the user's provided destination.

The central system 20 may include an administration system as part of the software instructions 27 that manage the central system 20. Administrators may log into the administration system to manage the database 22 including adding/removing venues, quadrants, beacons, etc., and otherwise managing the information stored therein as described herein.

Figure 15:
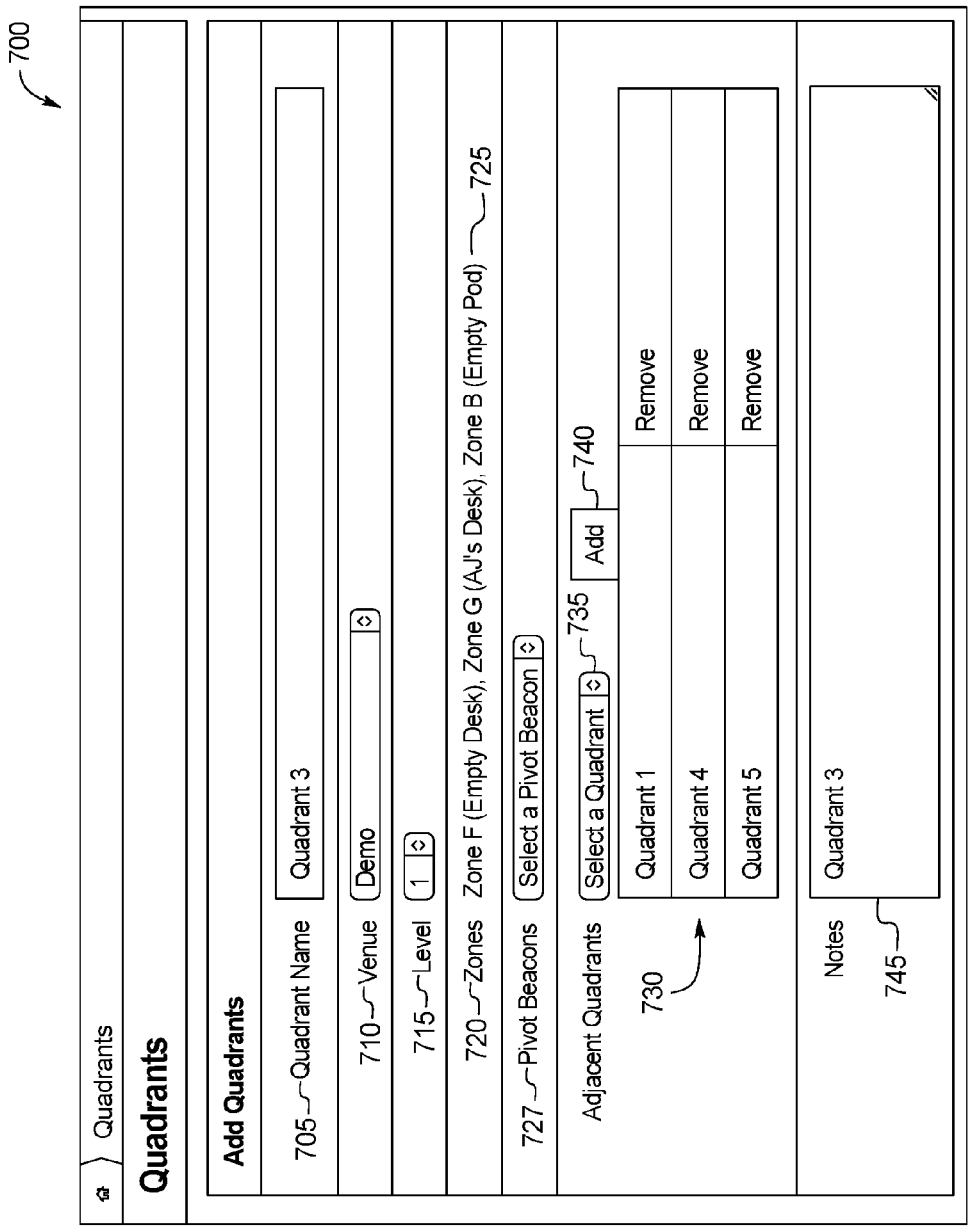
FIG. 15 illustrates an add quadrants screen of an administration system to permit an administrator to add or edit a quadrant in the database.

FIG. 15 illustrates an add quadrants screen 700 of the administration system to permit an administrator to add or edit a quadrant 650. The administrator may begin by assigning the quadrant 650 a name in the quadrant name field 705. The quadrant 650 may then be assigned a venue 710 from a dropdown box of available venues. For venues 710 with multiple floors, the quadrant 650 may be assigned a level 715. A list of zones 720 may list those zones 725 present in the quadrant 650.

Beacons 42 may be assigned to zones 660. A zone 725 is a permanent location in the venue 40 independent of its current use. For example, "Zone I" may be an office that is currently assigned the location "Joe's Office". At a future time, "Zone I" may be re-assigned to be "Jeff's Office." In this manner, named locations and beacons 42 may be updated without altering an underlying description of the venue 40.

The administrator may also set a pivot beacon 727 for the quadrant 650. The pivot beacon 727 may be used by the application 141 when a user is practicing moving through a venue 40 but is not actually on-site. When the user moves to a step in a new quadrant 650, the pivot beacon 727 is treated as the location that the user has arrived at, and the user is then routed to the destination from the pivot beacon 727.

To permit proper routing, the administrator may input those quadrants 650 that are adjacent to the quadrant 650 that is being added. To add an adjacent quadrant 730, the user may select the adjacent quadrant 650 using the quadrant selection box 735 and select the add button 740. Once the new adjacent quadrant 650 is added, it may be displayed in the list of adjacent quadrants 730. Finally, the add quadrants screen 700 may include a notes box 745 for the user to enter notes about the quadrant 650.

FIG. 16 illustrates a navigation data input screen 750 to permit an administrator to input navigation instructions between beacons and between beacons and quadrants 650. The administrator may begin by review the quadrant list 755 listing all of the available quadrants 650. For each quadrant 650, the administrator may choose between a beacon-to-beacon button 760 and a beacon-to-quadrant button 765. The beacon-to-beacon button 760 will permit the administrator to edit navigation instructions between beacons in the chosen quadrant 650. The beacon-to-quadrant button 765 will permit the administrator to edit navigation instructions that terminate at the chosen quadrant 650.

FIG. 17 illustrates an add beacon screen 800 for adding a beacon 42 to the database 22. When a new beacon 42 is added to the database 22, it may be scanned to retrieve the UUID 805. The beacon 42 may be assigned a major number 810 and a minor number 815. Major numbers 810 are provided by the beacon 42 to identify and distinguish a group—for example all beacons in on a certain floor or room in your venue could be assigned a unique major number 810. Minor numbers 815 are intended to identify and distinguish an individual beacon 42—for example distinguishing individual beacons 42 within a group of beacons assigned a major number 810.

To properly locate the beacon 42, the user may select the appropriate venue 820 that the beacon 42 will be installed at. If the beacon 42 is not to be used for navigation, then a navigation beacon checkmark 825 may be unchecked. The user may then assign the beacon 42 to a quadrant 830 and assign it a zone 835. The user may additionally provide a range setting 840 to limit the range at which the beacon 42 will trigger. Next, the user may input a description of the location represented by the beacon 42 by entering the description into a "tell me more" box 845. This information may be displayed in the "more info" text area 421 and announced when the user requests "tell me more." The override location name 850 permits the user to input text that will be announced when the user arrives at a location if something is desired other than what is listed for the location in the directory. Finally, the user may enter notes 855 about the location that the beacon 42 will be placed at, and press the save button 860 to confirm the entered data.

Referring back to FIG. 2, the mobile device 100 includes a memory interface 102, one or more data controllers, image controllers and/or central controllers 104, and a peripherals interface 106. The memory interface 102, the one or more controllers 104 and/or the peripherals interface 106 can be separate components or can be integrated in one or more integrated circuits. The various components in the mobile device 100 can be coupled by one or more communication buses or signal lines, as will be recognized by those skilled in the art.

Sensors, devices, and additional subsystems can be coupled to the peripherals interface 106 to facilitate various functionalities. For example, a motion sensor 108 (e.g., a gyroscope), a light sensor 110, and a positioning sensor 112 (e.g., GPS receiver) can be coupled to the peripherals interface 106 to facilitate the orientation, lighting, and positioning functions described further herein. Other sensors 114 can also be connected to the peripherals interface 106, such as a proximity sensor, a temperature sensor, a biometric sensor, or other sensing device, to facilitate related functionalities.

A camera subsystem 116 and an optical sensor 118 (e.g., a charged coupled device (CCD) or a complementary metal-oxide semiconductor (CMOS) optical sensor) can be utilized to facilitate camera functions, such as recording photographs and video clips.

Communication functions can be facilitated through one or more wireless communication subsystems 120, which can include radio frequency receivers and transmitters and/or optical (e.g., infrared) receivers and transmitters. The specific design and implementation of the communication subsystem 120 can depend on the communication network(s) over which the mobile device 100 is intended to operate. For example, the mobile device 100 can include communication subsystems 120 designed to operate over a GSM network, a GPRS network, an EDGE network, a Wi-Fi or WiMax network, and a Bluetooth network. In particular, the wireless communication subsystems 120 may include hosting protocols such that the mobile device 100 may be configured as a base station for other wireless devices.

An audio subsystem 122 can be coupled to a speaker 124 and a microphone 126 to facilitate voice-enabled functions, such as voice recognition, voice replication, digital recording, and telephony functions.

The I/O subsystem 128 can include a touch screen controller 130 and/or other input controller(s) 132. The touch-screen controller 130 can be coupled to a user display interface, such as a touch screen. The touch screen controller 130 can, for example, detect contact and movement, or break thereof, using any of a plurality of touch sensitivity technologies, including but not limited to capacitive, resistive, infrared, and surface acoustic wave technologies, as well as other proximity sensor arrays or other elements for determining one or more points of contact with the touch screen 134. The other input controller(s) 132 can be coupled to other input/control devices 136, such as one or more buttons, rocker switches, thumb-wheel, infrared port, USB port, and/or a pointer device such as a stylus. The one or more buttons (not shown) can include an up/down button for volume control of the speaker 124 and/or the microphone 126.

The memory interface 102 can be coupled to memory 138. The memory 138 can include high-speed random access memory and/or non-volatile memory, such as one or more magnetic disk storage devices, one or more optical storage devices, and/or flash memory (e.g., NAND, NOR). The memory 138 can store operating system instructions 140, such as Darwin, RTXC, LINUX, UNIX, OS X, iOS, ANDROID, BLACKBERRY OS, BLACKBERRY 10, WINDOWS, or an embedded operating system such as VxWorks. The operating system instructions 140 may include instructions for handling basic system services and for performing hardware dependent tasks. In some implementations, the operating system instructions 140 can be a kernel (e.g., UNIX kernel).

The memory 138 may also store communication instructions 142 to facilitate communicating with one or more additional devices, one or more computers and/or one or more servers. The memory 138 may include graphical user interface instructions 144 to facilitate graphic user interface processing; sensor processing instructions 146 to facilitate sensor-related processing and functions; phone instructions 148 to facilitate phone-related processes and functions; electronic messaging instructions 150 to facilitate electronic-messaging related processes and functions; web browsing instructions 152 to facilitate web browsing-related processes and functions; media processing instructions 154 to facilitate media processing-related processes and functions; GPS/Navigation instructions 156 to facilitate GPS and navigation-related processes and instructions; camera instructions 158 to facilitate camera-related processes and functions; and/or other software instructions 160 to facilitate other processes and functions (e.g., access control management functions, etc.). The memory 138 may also store other software instructions controlling other processes and functions of the mobile device 100 as will be recognized by those skilled in the art. In some implementations, the media processing instructions 154 are divided into audio processing instructions and video processing instructions to facilitate audio processing-related processes and functions and video processing-related processes and functions, respectively. An activation record and International Mobile Equipment Identity (IMEI) 162 or similar hardware identifier can also be stored in memory 138.

Each of the above identified instructions and applications can correspond to a set of instructions for performing one or more functions described herein. These instructions need not be implemented as separate software programs, procedures, or modules. The memory 138 can include additional instructions or fewer instructions. Furthermore, various functions of the mobile device 100 may be implemented in hardware and/or in software, including in one or more signal processing and/or application specific integrated circuits. Accordingly, the mobile device 100, as shown in FIG. 2, may be adapted to perform any combination of the functionality described herein.

One or more controllers 104 control aspects of the systems and methods described herein. The one or more controllers 104 may be adapted run a variety of application programs, access and store data, including accessing and storing data in associated databases, and enable one or more interactions via the mobile device 100. Typically, the one or more controllers 104 are implemented by one or more programmable data processing devices. The hardware elements, operating systems, and programming languages of such devices are conventional in nature, and it is presumed that those skilled in the art are adequately familiar therewith.

For example, the one or more controllers 104 may be a PC based implementation of a central control processing system utilizing a central processing unit (CPU), memories and an interconnect bus. The CPU may contain a single microprocessor, or it may contain a plurality of microprocessors 104 for configuring the CPU as a multi-processor system. The memories include a main memory, such as a dynamic random access memory (DRAM) and cache, as well as a read only memory, such as a PROM, EPROM, FLASH-EPROM, or the like. The system may also include any form of volatile or non-volatile memory. In operation, the main memory stores at least portions of instructions for execution by the CPU and data for processing in accord with the executed instructions.

The one or more controllers 104 may also include one or more input/output interfaces for communications with one or more processing systems. Although not shown, one or more such interfaces may enable communications via a network, e.g., to enable sending and receiving instructions electronically. The communication links may be wired or wireless.

The one or more controllers 104 may further include appropriate input/output ports for interconnection with one or more output displays (e.g., monitors, printers, user interface 170, motion-sensing input device 108, etc.) and one or more input mechanisms (e.g., keyboard, mouse, voice, touch, bioelectric devices, magnetic reader, RFID reader, barcode reader, user interface 170, motion-sensing input device 108, etc.) serving as one or more user interfaces for the controller. For example, the one or more controllers 104 may include a graphics subsystem to drive the output display. The links of the peripherals to the system may be wired connections or use wireless communications.

Although summarized above as a PC-type implementation, those skilled in the art will recognize that the one or more controllers 104 also encompasses systems such as host computers, servers, workstations, network terminals, and the like. Further one or more controllers 104 may be embodied in a mobile device 100, such as a mobile electronic device, like a smartphone or tablet computer. In fact, the use of the term controller is intended to represent a broad category of components that are well known in the art.

Hence aspects of the systems and methods provided herein encompass hardware and software for controlling the relevant functions. Software may take the form of code or executable instructions for causing a controller or other programmable equipment to perform the relevant steps, where the code or instructions are carried by or otherwise embodied in a medium readable by the controller or other machine. Instructions or code for implementing such operations may be in the form of computer instruction in any form (e.g., source code, object code, interpreted code, etc.) stored in or carried by any tangible readable medium.

As used herein, terms such as computer or machine "readable medium" refer to any medium that participates in providing instructions to a controller for execution. Such a medium may take many forms. Non-volatile storage media include, for example, optical or magnetic disks, such as any of the storage devices in any computer(s) shown in the drawings. Volatile storage media include dynamic memory, such as main memory of such a computer platform. Common forms of computer-readable media therefore include for example: a floppy disk, a flexible disk, hard disk, magnetic tape, any other magnetic medium, a CD-ROM, DVD, any other optical medium, punch cards paper tape, any other physical medium with patterns of holes, a RAM, a PROM and EPROM, a FLASH-EPROM, any other memory chip or cartridge, or any other medium from which a computer can read programming code and/or data. Many of these forms of computer readable media may be involved in carrying one or more sequences of one or more instructions to a processor for execution.

The audio navigation system 25 may use built-in location functionality of the mobile device 100 to determine its location and bearing. In some embodiments, in addition to the beacon 42, the audio navigation system 25 may use the positioning sensor 112 in the mobile device 100 to determine the user's current location. In an embodiment, the positioning sensor 112 may be a GPS unit. Additionally, the audio navigation system 25 may use an internal compass of the mobile device 100 to determine the orientations of the user and his or her current angle relative to a landmark or beacon 42. Further, the audio navigation system 25 may use the motion sensor 108, such as an accelerometer, to determine changes in direction of the mobile device 100. The GPS unit, compass, and accelerometer unit readings may be combined with the beacon's 42 information to increase the accuracy of the audio navigation system's 10 estimation of the user's current location, orientation, heading, and other navigation information. Additionally, aspects of the beacon's 42 signal may be used to determine the mobile device's 100 relative positioning to the beacon. For example, the signal strength and direction of the beacon's 42 signal may be used by the mobile device 100 to determine distance to the beacon 42 and the relative orientation of the user to the beacon 42.

It should be noted that various changes and modifications to the presently preferred embodiments described herein will be apparent to those skilled in the art. Such changes and modifications may be made without departing from the spirit and scope of the present invention and without diminishing its attendant advantages.

We claim:

1. A navigation system featuring audio prompts comprising:
   a database including a plurality of beacon identifiers, wherein each beacon identifier corresponds to a physical beacon, wherein each beacon identifier is associated a location, wherein each beacon is a member of a quadrant, wherein the database defines adjacent quadrants for every quadrant, wherein each quadrant includes one or more beacons, wherein the database includes navigation instructions from each beacon in a quadrant to every other beacon in that quadrant, wherein the database includes navigation instructions from each beacon in a quadrant to every adjacent quadrant;
   a user interface;
   a speaker;
   a communication module that detects and communicates with nearby beacons;
   a controller in communication with the user interface, the communication module, and the speaker;
   a memory in communication with the controller, the memory including instructions that, when executed by the controller, cause the controller to:
      provide a first beacon and a destination beacon,
      determine a route from the first beacon to the destination beacon in a destination quadrant, wherein the route is determined by finding a path from the first beacon to the destination beacon, wherein the route is an ordered list of navigation points to be encountered as the user moves from the first beacon to the destination beacon, wherein navigation points include beacons and quadrants,
      announce, via the speaker, navigation instructions for the user to navigate from the first beacon to a first quadrant of the route,
      for each quadrant along the route:
         in response to user movement along the route, receive, via the communication module, a newly encountered beacon identifier; and
         announce, via the speaker, navigation instructions for the user to navigate from the newly encountered beacon to the next quadrant in the ordered list, and
      upon receiving a beacon identifier of a detected beacon in the destination quadrant, announce, via the speaker, navigation instructions for the user to navigate from the detected beacon to the destination beacon.

2. The navigation system of claim 1, wherein the step to provide the first beacon and the destination beacon is accomplished by sub-steps to:
   receive, via the communication module, a first beacon identifier to determine the first beacon,
   lookup, in the database, a list of locations associated with the first beacon identifier,
   display the list of locations as a selectable list on the user interface, and
   receive a selection of one of the displayed locations from a user through the user interface, the beacon corresponding to the selected location being the destination beacon.

3. The navigation system of claim 2, wherein the list of locations includes an exit in the first position in the list, and a restroom in the second position in the list.

4. The navigation system of claim 2, wherein the list of locations is ranked by at least one of distance from the user, alphabetically, categorically, or combinations thereof.

5. The navigation system of claim 1, wherein, when the newly encountered beacon identifier matches a beacon identifier of the quadrant, announce, via the speaker, arrival at the newly encountered beacon.

6. The navigation system of claim 1, wherein each beacon is a Bluetooth low energy proximity device.

7. A navigation system featuring audio prompts comprising:
- a database including a plurality of beacon identifiers, wherein each beacon identifier corresponds to a physical beacon, wherein each beacon identifier is associated a location, wherein the database links a pair of beacon identifiers when a person is able to walk between the locations of the corresponding pair of beacons without passing the location of any other beacon;
- a user interface;
- a speaker;
- a communication module that detects and communicates with nearby beacons;
- a controller in communication with the user interface, the communication module, and the speaker;
- a memory in communication with the controller, the memory including instructions that, when executed by the controller, cause the controller to:
  - receive, via the communication module, a first beacon identifier from a first beacon,
  - receive a selection of a location from a user through the user interface,
  - identify a beacon corresponding to the selected location as a destination beacon,
  - determine a route from the first beacon to the destination beacon, wherein the route is determined by finding a path from the first beacon to the destination beacon, wherein the route is an ordered list of beacons to be encountered as the user moves from the first beacon to the destination beacon,
  - for each beacon along the route:
    - announce, via the speaker, navigation instructions for the user to navigate to a next beacon in the ordered list;
    - in response to user movement along the route, receive, via the communication module, a newly encountered beacon identifier;
    - when the newly encountered beacon identifier matches a beacon identifier of the next beacon in the ordered list, announce, via the speaker, arrival at the next beacon; and
    - update the next beacon to the following beacon in the ordered list, and
  - upon receiving a beacon identifier of the selected location, announce, via the speaker, arrival at the selected location.

8. The navigation system of claim 7, wherein the step to provide the destination beacon is accomplished by sub-steps to:
- lookup, in the database, a list of locations associated with the first beacon identifier,
- display the list of locations as a selectable list on the user interface, and
- receive a selection of one of the displayed locations from a user through the user interface, the beacon corresponding to the selected location being the destination beacon.

9. The navigation system of claim 8, wherein the list of locations includes an exit in the first position in the list, and a restroom in the second position in the list.

10. The navigation system of claim 8, wherein the list of locations is ranked by at least one of distance from the user, alphabetically, categorically, or combinations thereof.

11. The navigation system of claim 7, wherein, when the newly encountered beacon identifier matches a beacon identifier, announce, via the speaker, arrival at the newly encountered beacon.

12. The navigation system of claim 7, wherein each beacon is a Bluetooth low energy proximity device.

* * * * *